(12) United States Patent
Tang

(10) Patent No.: US 11,819,761 B2
(45) Date of Patent: Nov. 21, 2023

(54) DATA PLAY METHOD AND TERMINAL

(71) Applicant: BEIJING DAJIA INTERNET INFORMATION TECHNOLOGY CO., LTD., Beijing (CN)

(72) Inventor: Ye Tang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 79 days.

(21) Appl. No.: 17/690,474

(22) Filed: Mar. 9, 2022

(65) Prior Publication Data

US 2022/0379206 A1    Dec. 1, 2022

(30) Foreign Application Priority Data

May 31, 2021    (CN) .......................... 202110604949.2

(51) Int. Cl.
*A63F 13/44*    (2014.01)
*A63F 13/20*    (2014.01)
(Continued)

(52) U.S. Cl.
CPC .............. *A63F 13/44* (2014.09); *A63F 13/20* (2014.09); *A63F 13/31* (2014.09); *A63F 13/335* (2014.09);
(Continued)

(58) Field of Classification Search
CPC ........ A63F 13/25; A63F 13/30; A63F 13/327; A63F 13/33; A63F 13/332; A63F 13/335;
(Continued)

(56) References Cited

U.S. PATENT DOCUMENTS 11,245,944 B2 *    2/2022    Li ..................... H04N 21/26603
11,397,763 B1 *    7/2022    Barlaskar ............ G06F 16/7837
(Continued)

FOREIGN PATENT DOCUMENTS

CN    105335465 A    2/2016
CN    106874314 A    6/2017
(Continued)

OTHER PUBLICATIONS

Extended European Search Report Communication Pursuant to Rule 62 EPC, dated Aug. 12, 2022 in Patent Application No. EP 22163717.6 , which is a foreign counterpart application to which this application claims priority.
(Continued)

*Primary Examiner* — Omkar A Deodhar
(74) *Attorney, Agent, or Firm* — Kolitch Romano Dascenzo Gates LLC

(57) ABSTRACT

A data play method is provided. In response to an access operation on a virtual space, a terminal acquires a plurality of pieces of first interaction data issued in the virtual space by a plurality of first user accounts and a first matching degree corresponding to each piece of the first interaction data, and simultaneously plays at least two pieces of second interaction data among the plurality of pieces of first interaction data on a playing interface of the virtual space based on the first matching degrees corresponding to the plurality of pieces of first interaction data, such that play manners of the second interaction data having different first matching degrees are different.

20 Claims, 10 Drawing Sheets

(51) Int. Cl.
*A63F 13/31* (2014.01)
*A63F 13/335* (2014.01)
*A63F 13/358* (2014.01)
*A63F 13/86* (2014.01)
*H04N 21/2187* (2011.01)

(52) U.S. Cl.
CPC ............ *A63F 13/358* (2014.09); *A63F 13/86* (2014.09); *H04N 21/2187* (2013.01); *A63F 2300/5533* (2013.01); *A63F 2300/5546* (2013.01)

(58) Field of Classification Search
CPC ........ A63F 13/338; A63F 13/44; A63F 13/50; A63F 13/52; A63F 13/60; A63F 13/70; A63F 13/86; A63F 2300/577; A63F 2011/0097; H04N 21/2187
See application file for complete search history.

(56) References Cited

U.S. PATENT DOCUMENTS

| | | | |
|---|---|---|---|
| 2010/0153885 A1 | 6/2010 | Yates | |
| 2016/0184708 A1* | 6/2016 | Ziaja | H04N 21/2407 463/31 |
| 2017/0257646 A1* | 9/2017 | Wu | H04N 21/4788 |
| 2019/0163752 A1 | 5/2019 | Barlaskar et al. | |
| 2019/0238908 A1* | 8/2019 | Lu | H04N 21/23424 |
| 2020/0260149 A1* | 8/2020 | Ding | H04N 21/8146 |
| 2020/0280759 A1 | 9/2020 | Qiu | |
| 2021/0035559 A1 | 2/2021 | Xu | |
| 2021/0291061 A1* | 9/2021 | Tulewicz | A63F 13/86 |
| 2022/0188877 A1* | 6/2022 | Fokins | G06Q 30/0269 |
| 2022/0203228 A1* | 6/2022 | Wiggeshoff | A63F 13/86 |
| 2022/0337911 A1* | 10/2022 | Bayat | H04N 21/812 |
| 2023/0043174 A1* | 2/2023 | Zhang | H04N 21/4788 |

FOREIGN PATENT DOCUMENTS

| | | |
|---|---|---|
| CN | 108519991 A | 9/2018 |
| CN | 110139142 A | 8/2019 |
| CN | 112016986 A | 12/2020 |
| CN | 112115341 A | 12/2020 |
| CN | 112291632 A | 1/2021 |

OTHER PUBLICATIONS

The State Intellectual Property Office of People's Republic of China, First Office Action in Patent Application No. CN202110604949.2 dated Apr. 20, 2022, which is a foreign counterpart application corresponding to this U.S. Patent Application, to which this application claims priority.

China National Intellectual Property Administration, Notification to Grant Patent Right for Invention of Chinese Application No. 202110604949.2 dated Jun. 15, 2022, which is foreign counterpart application of this US application.

* cited by examiner

In response to an access operation on a virtual space, acquiring, by a second terminal, a plurality of pieces of first interaction data issued in the virtual space by a plurality of first user accounts and a first matching degree respectively corresponding to these pieces of first interaction data ⌇201

Simultaneously playing, on the terminal, at least two pieces of second interaction data among the plurality of pieces of first interaction data on a playing interface of the virtual space based on the first matching degrees corresponding to the plurality of pieces of first interaction data, wherein manners of playing the second interaction data having different first matching degrees are different ⌇202

FIG. 2

Acquiring, by a server, a plurality of pieces of first interaction data issued in a virtual space by a plurality of first user accounts and a weight of each piece of the first interaction data ⎯601

Determining, by the server, when positions of the two pieces of eighth interaction data in a queue are not adjacent to each other, an adjustment amplitude corresponding to either of the two pieces of eighth interaction data based on a difference between weights of the two pieces of eighth interaction data ⎯602

Sending, by the server, a first update message to a plurality of second terminals accessing the virtual space, wherein the first update message carries a first user account corresponding to the eighth interaction data and the adjustment amplitude ⎯603

Adjusting, by each second terminal, the weight of the eighth interaction data based on the adjustment amplitude carried in the first update message; adjusting a first matching degree corresponding to the eighth interaction data based on a matching degree between a first user account corresponding to the eighth interaction data and the second user account logged on to the second terminal as well as an adjusted weight of the eighth interaction data; and simultaneously playing, based on an adjusted first matching degree, at least two pieces of second interaction data on a playing interface of the virtual space, such that play manners for second interaction data having different first matching degrees are different, wherein the at least two pieces of second interaction data are first interaction data having a larger first matching degree among the plurality of pieces of first interaction data ⎯604

FIG. 6

DATA PLAY METHOD AND TERMINAL

This disclosure is based on and claims priority to Chinese Patent Application No. 202110604949.2, filed on May 31, 2021, the disclosure of which is herein incorporated by reference in its entirety.

TECHNICAL FIELD

The present disclosure relates to the field of computer technologies, and in particular relates to a data play method and a terminal.

BACKGROUND

With development of computer technologies, the live streaming function is becoming more and more popular among users. Live streaming data of a plurality of anchors' accounts is issued in a live streaming room to enrich the played live streaming data, so that the plurality of anchors can perform live streaming cooperatively. In this case, terminals of audience entering the live streaming room can play a plurality of pieces of live streaming data issued in the live streaming room.

SUMMARY

The present disclosure provides a data play method and a terminal.

According to one aspect of an embodiment of the present disclosure, there is provided a data play method, which is executed by a terminal. The method includes:

in response to an access operation on a virtual space, acquiring a plurality of pieces of first interaction data issued in the virtual space by a plurality of first user accounts and a first matching degree corresponding to each piece of the first interaction data, wherein the first matching degree is used to indicate a matching degree between a first user account corresponding to the first interaction data and a second user account logged onto the terminal, and/or an interaction on the first interaction data performed by a third user account accessing the virtual space; and simultaneously playing at least two pieces of second interaction data among the plurality of pieces of first interaction data on a playing interface of the virtual space based on the first matching degrees corresponding to the plurality of pieces of first interaction data, such that manners of playing the second interaction data having different first matching degrees are different.

In some embodiments, said simultaneously playing the at least two pieces of second interaction data among the plurality of pieces of first interaction data on the playing interface of the virtual space based on the first matching degrees includes:

selecting at least two pieces of second interaction data having a larger first matching degree from the plurality of pieces of first interaction data based on the first matching degrees; and simultaneously playing the at least two pieces of second interaction data on the playing interface of the virtual space.

In some embodiments, selecting the at least two pieces of second interaction data having the larger first matching degree from the plurality of pieces of first interaction data based on the first matching degrees includes:

determining an average value of the first matching degrees corresponding to the plurality of pieces of first interaction data; and selecting at least two pieces of second interaction data having the larger first matching degree from the plurality of pieces of first interaction data based on the average value of the first matching degrees corresponding to the plurality of pieces of first interaction data, wherein a first matching degree of each of the at least two pieces of the second interaction data is larger than the average value.

In some embodiments, the data play method further includes:

in a case that positions of the at least two pieces of second interaction data in a queue change, selecting at least two pieces of third interaction data having a larger first matching degree from the plurality of pieces of first interaction data based on the first matching degrees, wherein in the queue, the plurality of pieces of first interaction data are ranked in an ascending or descending order based on corresponding first matching degrees; and simultaneously playing the at least two pieces of third interaction data on the playing interface.

In some embodiments, the data play method further includes:

displaying one or more fourth user accounts corresponding to fourth interaction data on the playing interface, wherein the fourth interaction data is interaction data included in the plurality of pieces of first interaction data but different from the second interaction data, and the fourth user account is a user account issuing the fourth interaction data; and playing the fourth interaction data on the playing interface in response to a trigger operation on any fourth user account.

In some embodiments, said playing the fourth interaction data on the playing interface in response to the trigger operation on any fourth user account includes:

displaying a pop-up window on the playing interface, and playing the fourth interaction data in the pop-up window in response to the trigger operation on the fourth user account.

In some embodiments, the data play method further includes:

cancelling playing of the fourth interaction data after a playing duration of the fourth interaction data reaches a first duration.

In some embodiments, the playing interface includes at least two playing regions of different sizes, and said simultaneously playing the at least two pieces of second interaction data among the plurality of pieces of first interaction data on the playing interface of the virtual space based on the first matching degrees includes:

playing the at least two pieces of first interaction data in the at least two playing regions based on the first matching degrees, such that second interaction data played in a playing region of a larger size corresponds to a larger first matching degree.

In some embodiments, the playing interface further includes an account displaying region whose size is smaller than a size of each playing region; and the data play method further includes:

displaying one or more fourth user accounts corresponding to fourth interaction data in the account displaying region, wherein the fourth interaction data is interaction data included in the plurality of pieces of first interaction data but different from the second interaction data, and the fourth user account is a user account issuing the fourth interaction data; and playing the fourth interaction data on the playing interface in response to a trigger operation on any fourth user account.

In some embodiments, the data play method further includes:

in response to detection of a confirmation operation on the fourth interaction data during a process of playing the fourth interaction data, replacing second interaction data played in a playing region with the smallest size with the fourth interaction data; or in response to a playing duration of the fourth interaction data reaching a target duration, replacing the second interaction data played in a playing region with the smallest size with the fourth interaction data.

In some embodiments, the playing interface further includes an account displaying region whose size is smaller than a size of each playing region; and the data play method further includes:

displaying one or more fourth user accounts corresponding to fourth interaction data in the account displaying region, wherein the fourth interaction data is interaction data included in the plurality of pieces of first interaction data but different from the second interaction data, and the fourth user account is a user account issuing the fourth interaction data; and in response to a drag operation on any of the fourth user account and releasing the drag operation in any of the playing regions, replacing the second interaction data played in the playing region with the fourth interaction data.

In some embodiments, the data play method further includes:

displaying a user account corresponding to the replaced second interaction data in the account displaying region.

In some embodiments, said acquiring the first matching degree corresponding to each piece of the first interaction data includes:

acquiring second matching degrees between the plurality of first user accounts and the second user account; and determining the first matching degree corresponding to each piece of the first interaction data based on second matching degrees.

In some embodiments, acquiring the second matching degrees between the plurality of first user accounts and the second user account includes:

acquiring type tags corresponding to all of the first user accounts and a type tag corresponding to the second user account;

determining a first number corresponding to each of the first user accounts, wherein the first number is used to indicate the number of type tags that correspond to the first user account and the same as the type tag corresponding to the second user account; and determining a second matching degree between each of the first user accounts and the second user account based on the first number corresponding to the first user account.

In some embodiments, determining the second matching degree between each of the first user accounts and the second user account based on the first number corresponding to the first user account includes:

for any first user account, determining a ratio of the first number corresponding to the first user account to a second number as the second matching degree between the first user account and the second user account, wherein the second number is the number of type tags corresponding to the second user account.

In some embodiments, the access operation is triggered based on a virtual space entry corresponding to a target user account; the target user account is any of the plurality of first user accounts; and said determining the first matching degree corresponding to each piece of the first interaction data based on the second matching degrees:

acquiring a weight of each piece of the first interaction data;

adjusting a weight of target interaction data based on a relationship between the target user account and the second user account, wherein the target interaction data corresponds to the target user account; and determining the first matching degree corresponding to each piece of first interaction data based on the second matching degrees, an adjusted weight of the target interaction data, and a weight of fifth interaction data, wherein the fifth interaction data is interaction data included in the plurality of pieces of first interaction data but different from the target interaction data.

In some embodiments, determining the first matching degree corresponding to each piece of first interaction data based on the second matching degree between each of the first user accounts and the second user account, the adjusted weight of the target interaction data, and the weight of the fifth interaction data includes:

determining a sum value of the adjusted weight of the target interaction data and the weight of the fifth interaction data;

determining a first ratio of the adjusted weight of the target interaction data to the sum value and a second ratio of the weight of the fifth interaction data to the sum value;

determining a product of a second matching degree corresponding to the target user account and the first ratio as a first matching degree corresponding to the target interaction data; and determining a product of a second matching degree corresponding to the fifth interaction data and the second ratio as a first matching degree corresponding to the fifth interaction data, wherein the second matching degree corresponding to the fifth interaction data is a matching degree between a first user account corresponding to the fifth interaction data and the second user account.

In some embodiments, adjusting the weight of the target interaction data based on the relationship between the target user account and the second user account includes:

determining a third increase amplitude of the target interaction data based on whether the target user account is a user account that the second user account follows; and increasing the weight of the target interaction data based on the third increase amplitude.

In some embodiments, determining the third increase amplitude of the target interaction data based on whether the target user account is the user account that the second user account follows includes any one of the followings:

when the target user account is not the user account that the second user account follows, and the virtual space entry is a virtual space entry searched based on the target user account, determining a first value as the third increase amplitude of the target interaction data; and when the target user account is not the user account that the second user account follows, and the virtual space entry is a virtual space entry that corresponds to the target user account and that is of a user account screened based on a screening condition, determining a second value as the third increase amplitude of the target interaction data, wherein the screening condition is used to screen the user account; and the first value is larger than the second value.

In some embodiments, the data play method further includes:

adjusting the second matching degrees between the plurality of first user accounts and the second user account in response to an interaction operation on any second interaction data that is being played; and re-determining the first matching degree corresponding to each piece of first interaction data based on an adjusted second matching degree between each of the first user accounts and the second user account.

In some embodiments, adjusting the second matching degrees between the plurality of first user accounts and the second user account in response to the interaction operation on any second interaction data that is being played includes:

determining a fourth increase amplitude of a second matching degree corresponding to the second interaction data based on the number of the interaction operation on the second interaction data, wherein the second matching degree corresponding to the second interaction data is a matching degree between a first user account corresponding to the second interaction data and the second user account;

determining a ratio of the fourth increase amplitude to a third number as a decrease amplitude, wherein the third number is the number of pieces of interaction data that is among the plurality of pieces of first interaction data and different from the target interaction data;

increasing the second matching degree corresponding to the second interaction data based on the fourth increase amplitude; and decreasing a second matching degree corresponding to eleventh interaction data based on the decrease amplitude, wherein the eleventh interaction data is interaction data among the plurality of pieces of first interaction data and different from the second interaction data, and the second matching degree corresponding to the eleventh interaction data is a matching degree between a first user account corresponding to the eleventh interaction data and the second user account.

In some embodiments, the data play method further includes:

increasing the first matching degree corresponding to the second interaction data in response to an interaction operation on any second interaction data.

In some embodiments, increasing the first matching degree corresponding to the second interaction data in response to the interaction operation on any second interaction data includes at least one of the followings:

increasing the first matching degree corresponding to the second interaction data by a third value in response to a like giving operation on the second interaction data; and in response to a resource transferring operation on the first user account corresponding to the second interaction data, determining a product of the number of resources corresponding to the resource transferring operation and a fourth value as a fifth value, and increasing the first matching degree corresponding to the second interaction data by the fifth value.

In some embodiments, the data play method further includes:

sending an update message to a server, wherein the update message carries the first user account corresponding to the second interaction data and a fifth increase amplitude of the first matching degree corresponding to the second interaction data, the server is used to forward the update message to another terminal to which a fourth user account logs on, such as the another terminal increases the first matching degree corresponding to the second interaction data by the fifth increase amplitude based on the update message, wherein the fourth user account is a user account that is of the fourth user account accessing the virtual space and different from the second user account.

In some embodiments, the data play method further includes:

receiving an update message sent by a server, wherein the update message carries any first user account and a target value; and increasing a first matching degree corresponding to sixth interaction data by the target value based on the update message, wherein the sixth interaction data corresponds to the first user account carried in the update message.

In some embodiments, the update message further carries a play time point; the play time point indicates a time point at which the first matching degree corresponding to the sixth interaction data is increased; and said increasing the first matching degree corresponding to the sixth interaction data by the target value based on the update message includes:

increasing the first matching degree corresponding to the sixth interaction data by the target value in response to the sixth interaction data reaching the play time point, based on the update message.

In some embodiments, the first matching degree corresponding to the first interaction data is generated based on a second matching degree corresponding to the first user account and the weight of the first interaction data; the second matching degree corresponding to the first user account is a matching degree between the first user account and the second user account; and the data play method further includes:

receiving an update message sent by a server, wherein the update message carries any first user account and a first increase amplitude;

increasing a weight of seventh interaction data by the first increase amplitude, wherein the seventh interaction data corresponds to the first user account; and updating the first matching degree corresponding to the seventh interaction data based on the second matching degree corresponding to the first user account and an increased weight of the seventh interaction data.

In some embodiments, the first increase amplitude is acquired by the server based on the weight of the seventh interaction data and a weight of twelfth interaction data; the twelfth interaction data is interaction data whose data type is the same as that of the seventh interaction data; and the data play method further includes:

correspondingly storing the first user account and the first increase amplitude that are carried in the update message; receiving a cancel message sent by the server, wherein the cancel message carries the first user account; searching for the first increase amplitude stored corresponding to any first user account based on the first user account carried in the cancel message; decreasing the weight of the seventh interaction data by the first increase amplitude; and updating the first matching degree corresponding to the seventh interaction data based on the second matching degree corresponding to the first user account and a decreased weight of the seventh interaction data; or receiving a cancel message sent by the server, wherein the cancel message carries the first user account and the first increase amplitude; decreasing the weight of the seventh interaction data by the first increase amplitude based on the cancel message; and updating the first matching degree corresponding to the seventh interaction data based on the second matching degree corresponding to the first user account and a decreased weight of the seventh interaction data.

According to another aspect of an embodiment of the present disclosure, there is provided a data play method, which is executed by a server. The method includes:

acquiring a plurality of pieces of first interaction data issued in a virtual space by a plurality of first user accounts and a weight of each piece of the first interaction data;

determining an adjustment amplitude corresponding to eighth interaction data based on ranking information of the plurality of pieces of first interaction data, wherein the adjustment amplitude is used to adjust a weight of the eighth interaction data; the ranking information indicates that the plurality of pieces of first interaction data are ranked in an ascending or descending order based on weights; and the eighth interaction data is any piece of first interaction data; and sending a first update message to a plurality of terminals accessing the virtual space, wherein the first update message carries a first user account corresponding to the eighth interaction data and the adjustment amplitude.

In some embodiments, said determining the adjustment amplitude corresponding to the eighth interaction data based on the ranking information of the plurality of pieces of first interaction data includes:

in a case that positions of the two pieces of eighth interaction data in a queue are not adjacent to each other, determining an adjustment amplitude corresponding to either of the two pieces of eighth interaction data based on a difference between weights of the two pieces of eighth interaction data, wherein the two pieces of eighth interaction data are any two pieces of first interaction data whose data types are the same.

In some embodiments, the data play method further includes:

acquiring the number of comments in the virtual space within a current time segment;

determining a second increase amplitude for a weight of ninth interaction data based on a data type to which each piece of the first interaction data belongs within the current time segment and the number of comments, wherein the ninth interaction data is first interaction data that belongs to a target data type within the current time segment; and sending a second update message to the plurality of terminals, wherein the second update message carries a first user account corresponding to the ninth interaction data and the second increase amplitude.

In some embodiments, determining the second increase amplitude for the weight of the ninth interaction data based on the data type to which each piece of the first interaction data belongs within the current time segment and the number of comments includes:

determining a fourth number, wherein the fourth number is the number of pieces of the ninth interaction data;

rounding a ratio between the number of comments and the fourth number to acquire a sixth value; and determining a product of a unit increase amplitude and the sixth value as the second increase amplitude.

In some embodiments, the data play method further includes:

identifying contents of each piece of the first interaction data, and determining a data type to which each piece of the first interaction data belongs, wherein the data type to which the first interaction data belongs indicates a data type to which contents included in the first interaction data belongs.

In some embodiments, acquiring a weight of each piece of the first interaction data includes:

acquiring an initial weight of each piece of the first interaction data; and updating the initial weights of the plurality of pieces of first interaction data based on a third update message sent by the plurality of terminals.

In some embodiments, updating the initial weights of the plurality of pieces of first interaction data based on the third update message sent by the plurality of terminals includes:

receiving the third update message sent by any of the terminals, wherein the third update message carries any first user account and a sixth increase amplitude; and increasing an initial weight of first interaction data corresponding to the first user account by the sixth increase amplitude based on the third update message.

According to still another aspect of an embodiment of the present disclosure, there is provided a terminal. The terminal includes: one or more processors; and one or more volatile or non-volatile memories for storing instructions executable by the one or more processors, wherein the one or more processors is/are used to execute the following steps: in response to an access operation on a virtual space, acquiring a plurality of pieces of first interaction data issued in the virtual space by a plurality of first user accounts and first matching degree corresponding to each piece of first interaction data, wherein the first matching degree is used to indicate a matching degree between a first user account corresponding to the first interaction data and a second user account logged on to the terminal, and/or interaction on the first interaction data performed by a third user account accessing the virtual space; and simultaneously playing at least two pieces of second interaction data among the plurality of pieces of first interaction data on a playing interface of the virtual space based on the first matching degrees corresponding to the plurality of pieces of first interaction data, such that manners of playing the second interaction data having different first matching degrees are different.

According to yet another aspect of an embodiment of the present disclosure, there is provided a server. The server includes: one or more processors; and one or more volatile or non-volatile memories for storing instructions executable by the one or more processors, wherein the one or more processors is/are used to execute the following steps: acquiring a plurality of pieces of first interaction data issued in a virtual space by a plurality of first user accounts and a weight of each piece of the first interaction data; determining an adjustment amplitude corresponding to eighth interaction data among the plurality of pieces of first interaction data based on ranking information of the plurality of pieces of first interaction data, wherein the adjustment amplitude is used to adjust a weight of the eighth interaction data; and the ranking information indicates that the plurality of pieces of first interaction data are ranked in an ascending or descending order based on weights; and sending a first update message to a plurality of terminals accessing the virtual space, wherein the first update message carries a first user account corresponding to the eighth interaction data and the adjustment amplitude.

BRIEF DESCRIPTION OF THE DRAWINGS

FIG. 2 is a flowchart of a data play method according to an embodiment of the present disclosure;

FIG. 6 is a flowchart of still yet another data play method according to an embodiment of the present disclosure;

DETAILED DESCRIPTION

Terms "at least one", "a plurality of", "each", and "any" are used in the present disclosure, wherein "at least one" indicates one, two, or more; "a plurality of" indicates two or more; "each" indicates each of "a plurality of"; and "any" indicates any of "a plurality of". For example, if a plurality of first user accounts include three first user accounts, "each" of the three first user accounts means each of the three first user accounts; and "any" of the three first user accounts means any of the three first user accounts, and may be the first one, the second one, or the third one of the first user accounts.

It should be noted that, all account information (including but is not limited to user equipment information, user personal information, or the like) in the present disclosure is information authorized by a user or sufficiently authorized by all parties.

Figure 1:
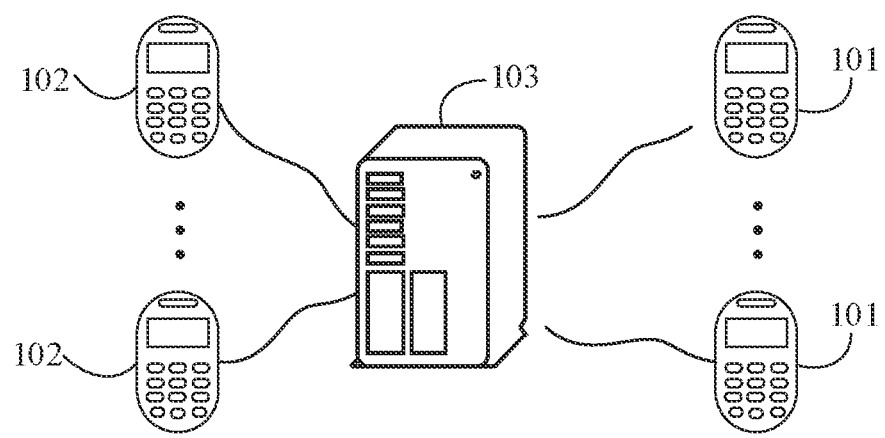
FIG. 1 is a schematic diagram of an implementation environment of a data play method according to an embodiment of the present disclosure.

FIG. 1 is a schematic diagram of an implementation environment of a data play method according to an embodiment. The implementation environment includes: a plurality of first terminals 101 and a second terminal 102, and a server 103. Network connections are established among the server 103 and the plurality of first terminals 101 and second terminal 102, such that the plurality of first terminals 101 and the second terminal 102 can all interact with the server 103 via the network connections.

In some embodiments, the first terminal or the second terminal is a mobile phone, a tablet computer, a computer, or another type of a terminal. In some embodiments, the server is a server, a server cluster composed of several servers, or a cloud computing service center.

In some embodiments, each first terminal 101 is a terminal to which a first user account logs on; and the second terminal 102 is a terminal to which a second user account logs on. In some embodiments, the implementation environment further includes another second terminal 102. The another second terminal 102 is a terminal to which a third user account different from the second user account logs on. A target application is installed on each first terminal 101 and each second terminal 102, and the server 103 can provide a service for the target application. Each first terminal 101 and each second terminal 102 can implement functions such as data transmission, message interaction, and the like via the installed target application. The target application has a data play function. Certainly, the target application can further have other functions, such as a shopping function, a game function, and a review function.

The server 103 creates a same virtual space for a plurality of first user accounts logged on to the plurality of first terminals 101. A virtual space accessed by the at least one second terminal 102 is the virtual space created by the server 103 for the plurality of first terminals 101. Each first terminal 101 logs on to the target application based on one first user account, and uploads acquired interaction data to the server 103 via the target application. The server 103 receives the interaction data uploaded by each first terminal 101, and issues the received interaction data in the virtual space corresponding to the plurality of first terminal 101, such that each second terminal 102 accessing the virtual space can acquire, via the target application, a plurality of pieces of interaction data issued in the virtual space, and play the received interaction data.

In some embodiments, the first user account is an anchor's account; the second user account is an audience's account; the first terminal 101 is an anchor's terminal where the anchor' account logs on; and the second terminal 102 is an audience's terminal where the audience's account logs on. The target application installed on each first terminal 101 and each second terminal 102 is a live streaming application and the virtual space is a live streaming room created by the server 103 for a plurality of anchor's terminals.

The method provided in this embodiment of the present disclosure can be applied to various scenarios.

For example, in a live streaming scenario. An audience's terminal logs on to a live streaming application via an audience's account and can view live streaming room entries corresponding to a plurality of anchor's accounts via the live streaming application, and the audience's terminal sends a live streaming room access request to a live streaming server that provides a service for the live streaming application via a live streaming room entry corresponding to a target anchor's account. The live streaming server returns a plurality of pieces of live streaming data to be issued in the live streaming room based on the live streaming room access request. The audience's terminal receives the plurality of pieces of live streaming data sent by the live streaming server, acquires first matching degree corresponding to each piece of live streaming data, and then plays at least two pieces of first live streaming data among a plurality of pieces of subsequent live streaming data, based on the first matching degrees corresponding to the plurality of pieces of live streaming data, such that play manners of first live streaming data having different first matching degrees are different, and first live streaming data being played matches the audience's account, thereby improving a play effect.

FIG. 2 is a flowchart of a data play method according to an embodiment. As shown in FIG. 2, the method is executed by the second terminal and includes the following steps.

In step 201, in response to an access operation on a virtual space, the second terminal acquires a plurality of pieces of first interaction data issued in the virtual space by a plurality of first user accounts and first matching degree corresponding to each piece of the first interaction data.

The first matching degree is used to indicate a matching degree between a first user account corresponding to the first interaction data and a second user account logged onto the terminal, and/or interaction of a third user account accessing the virtual space on the first interaction data. In some embodiments, a plurality of third user accounts accessing the virtual space include the second user account, that is, the second user account is also a third virtual account accessing the virtual space. For example, the plurality of third user accounts are audience's accounts accessing the virtual space, and the second user account is any of the plurality of audience's accounts. In some embodiments, the first interaction data includes multimedia data, and the first user account has permission to issue the multimedia data in the virtual space. The second terminal responds to the access operation on the virtual space, which means it is required to access the virtual space, and acquires the plurality of pieces of first interaction data issued in the virtual space, such that the second terminal can subsequently play the interaction data issued in the virtual space.

In step 202, the second terminal simultaneously plays at least two pieces of second interaction data among the plurality of pieces of first interaction data on a playing interface of the virtual space based on the first matching degrees corresponding to the plurality of pieces of first interaction data, such that manners of playing the second interaction data having different first matching degrees are different.

Each piece of the second interaction data is interaction data among the plurality of pieces of first interaction data. The play manner is used to indicate a manner of playing corresponding interaction data. Because the first matching degree corresponding to the first interaction data can indicate a possibility that the second user account likes the first interaction data, second interaction data having different first matching degrees is played in different manners, such that second interaction data that is being played matches the second user account.

The data play method according to this embodiment of the present disclosure provides a method of presenting interaction data in a multi-person joint interaction virtual space. During playing of a plurality of pieces of first interaction data issued in a multi-person joint interaction virtual space, second interaction data having different first matching degrees is played in different manners based on first matching degrees corresponding to the plurality of pieces of first interaction data, such that interaction data that is being played matches a second user account, thereby highlighting the interaction data that matches the like of the second user account, realizing personalized play and improving the play effect.

Figure 3:
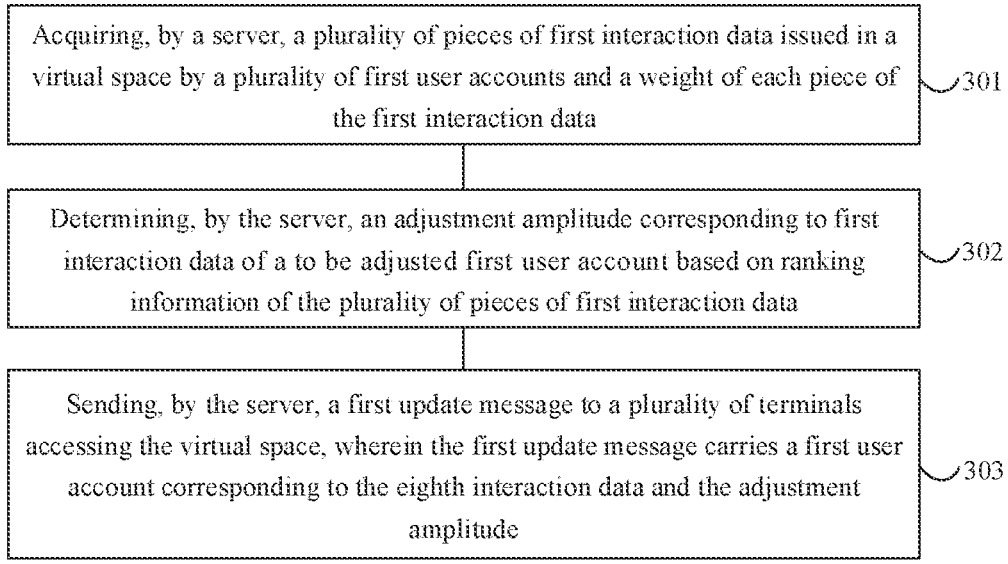
FIG. 3 is a flowchart of another data play method according to an embodiment of the present disclosure.

FIG. 3 is a flowchart of a data play method according to an embodiment. As shown in FIG. 3, the method is executed by a server and includes the following steps.

In step 301, the server acquires a plurality of pieces of first interaction data issued in a virtual space by a plurality of first user accounts and a weight of each piece of the first interaction data.

The first user account has permission to issue multimedia data included in the interaction data in the virtual space. The weight of each piece of the first interaction data is used to indicate how much a user account accessing the virtual space likes the first interaction data.

In step 302, the server determines an adjustment amplitude corresponding to eighth interaction data based on ranking information of the plurality of pieces of first interaction data.

The adjustment amplitude is used to adjust a weight of the eighth interaction data. The ranking information indicates that the plurality of pieces of first interaction data are ranked in an ascending or descending order based on weights. The eighth interaction data is any piece of first interaction data.

In step 303, the server sends a first update message to a plurality of terminals accessing the virtual space, where the first update message carries a first user account corresponding to the eighth interaction data and the adjustment amplitude.

The data play method according to this embodiment of the present disclosure provides a multi-person joint interaction. In the case of multi-person joint interaction, an adjustment amplitude of a weight of any first interaction data is determined based on ranking information of a plurality of pieces of first interaction data issued in a same virtual space by a plurality of first user accounts, such that a terminal subsequently adjusts the weight of the first interaction data based on the adjustment amplitude, to guarantee the effect of subsequently playing the interaction data by the terminal.

Figure 4:
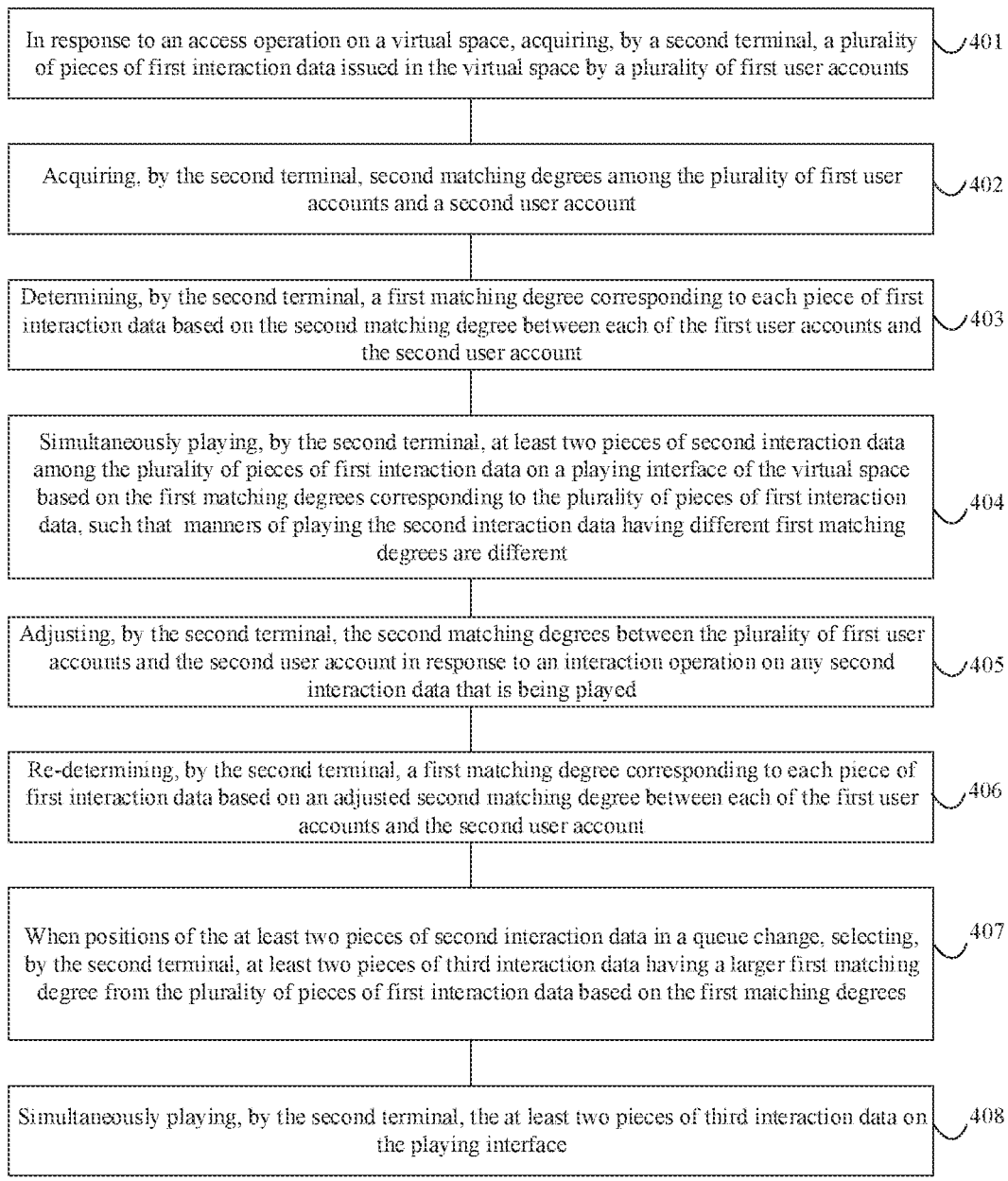
FIG. 4 is a flowchart of still another data play method according to an embodiment of the present disclosure.

FIG. 4 is a flowchart of a data play method according to an embodiment of the present disclosure. The data play method according to this embodiment of the present disclosure provides a method of displaying the first interaction data issued in a multi-person joint interaction virtual space. For a plurality of pieces of first interaction data issued by a plurality of first user accounts (e.g., anchors accounts), a user of a second user account (e.g., audience account) may favor the plurality of pieces of first interaction data in different degrees and may like one piece of interaction data than another piece. The method of the present disclosure determines a matching degree between a first user account corresponding to the first interaction data and second user accounts, and displays the plurality of pieces of the first interaction data in different manners depending on the matching degree. In the implementation of some embodiments of the present disclosure, the first interaction data from multiple anchor accounts can appear on a terminal of the audience account in different manners. For example, on the audience terminal, the first interaction data that is most likely favored by the audience is displayed in a more noticeable manner than other first interaction data. The matching degree is determined based various factors that correlates the first interaction data corresponding to a first user account to the second user accounts. Further, the matching degree is adjusted or re-determined during live streaming based on the interaction performed on the first interaction data by the second user accounts, which further increases the accuracy of the matching degree. In the present disclosure, the first interaction data is also referred as second interaction data, third interaction data, fourth interaction data etc. based on its the matching degree. As shown in FIG. 4, the method is executed by a second terminal and includes the following steps.

In step 401, the second terminal acquires, in response to an access operation on a virtual space, a plurality of pieces of first interaction data issued in a virtual space by a plurality of first user accounts.

The virtual space is used to issue interaction data. The first user account has permission to issue multimedia data in the virtual space. The first interaction data includes the multimedia data. A second user account logged on to the second terminal can access the virtual space, and can play the interaction data issued in the virtual space. In some embodiments, the virtual space is a live streaming room; the first user account is an anchor's account in the live streaming room; and the second user account is an audience's account accessing the live streaming room.

The first interaction data issued in the virtual space by the first user account is used to interact with a third user account accessing the virtual space. In some embodiments, a plurality of third user accounts accessing the virtual space include the second user account, that is, the second user account is also the third virtual account accessing the virtual space. For example, the plurality of third user accounts are audience's accounts accessing the virtual space, and the second user account is any of the plurality of audience's accounts. In some embodiments, the first interaction data includes multimedia data. For example, the multimedia data is voice data, video data, image data, or the like. In some embodiments, the first interaction data includes virtual resource data. For example, the virtual resource data is red packet data, coupon data, or the like.

In this embodiment of the present disclosure, each first user account indicates one anchor. Each first user account issues one piece of first interaction data in the virtual space. A plurality of first user accounts issue a plurality of pieces of first interaction data in a same virtual space. In other words, the plurality of first user accounts interact in the same virtual space, thereby achieving an effect of joint interaction of a plurality of anchors. The access operation on the virtual space indicates that the virtual space needs to be accessed. In response to the access operation on the virtual space, the second terminal acquires the plurality of pieces of first interaction data issued in the virtual space, such that the second terminal can subsequently play the first interaction data issued in the virtual space.

In some embodiments, the step 401 include: in response to a trigger operation on a virtual space entry corresponding to a target user account, the second terminal acquires a plurality of pieces of first interaction data issued in the virtual space by the plurality of first user accounts.

The target user account is any of the plurality of first user accounts. In this embodiment of the present disclosure, when any first user account issues first interaction data in the virtual space, it means that an anchor indicated by the first user account is performing live streaming. A virtual space entry is provided for the first user account, and indicates a virtual space where the first user account is, such that the second user account can access the virtual space where the first user account is via the virtual space entry corresponding to the first user account. In some embodiments, the virtual space entry is a link to the virtual space or an option for accessing the virtual space.

When the second terminal detects the trigger operation on the virtual space entry corresponding to the target user account, it means that an audience needs to view the first interaction data issued in the virtual space. Therefore, the second terminal acquires the plurality of pieces of first interaction data issued in the virtual space.

In a possible implementation of the foregoing embodiment, the second terminal sends a data acquiring request to a server in response to the trigger operation on the virtual space entry corresponding to the target user account. The server sends, to the second terminal based on a virtual space identifier carried in the data acquiring request, a plurality of pieces of first interaction data issued in a virtual space indicated by the virtual space identifier. The second terminal receives the plurality of pieces of first interaction data sent by the server. The virtual space identifier indicates a virtual space corresponding to the virtual space entry. In some embodiments, the virtual space identifier is a virtual space ID, a virtual space name, or the like.

In a possible implementation of the foregoing embodiment, the target user account is a first user account that the second user account logged on to the second terminal follows.

For example, the second terminal displays a plurality of fifth user accounts that the second user account follows and a virtual space entry corresponding to each fifth user account, and in response to the trigger operation on the virtual space entry corresponding to the target user account, acquires a plurality of pieces of first interaction data issued in the virtual space indicated by the virtual space entry. The fifth user account is an account that the second user account follows. The target user account is any of the plurality of fifth user accounts. The plurality of first user accounts are user accounts issuing the first interaction data in the virtual space. The plurality of fifth user accounts are user accounts that the second user account follows. The plurality of first user accounts and the plurality of fifth user accounts include at least one same user account. For example, all the plurality of first user accounts and the plurality of fifth user accounts include the target user account.

For another example, the second terminal displays the target user account that the second user account follows and a virtual space entry corresponding to the target user account; and in response to the trigger operation on the virtual space entry acquires the plurality of pieces of first interaction data issued in the virtual space indicated by the virtual space entry. Each piece of first interaction data is issued in the virtual space by one first user account.

In a possible implementation of the foregoing embodiment, the target user account is not a user account that the second user account follows. In other words, when the target user account is not a user account that the second user account follows, the virtual space entry corresponding to the target user account is a virtual space entry searched based on the target user account; or the virtual space entry corresponding to the target user account is a virtual space entry that corresponds to the first user account and is screened based on a screening condition. The screening condition is used to screen a user account.

For example, based on a search interface and the target user account, the second terminal searches for the virtual space entry corresponding to the target user account, displays the virtual space entry, and acquires a plurality of pieces of interaction data issued in the virtual space by the plurality of first user accounts in response to the trigger operation on the virtual space entry.

For another example, the second terminal displays at least one sixth user account and a virtual space entry corresponding to each sixth user account based on a screening condition, and in response to a trigger operation on a virtual space entry corresponding to a target user account in the at least one sixth user account, the second terminal acquires a plurality of pieces of first interaction data issued in the virtual space indicated by the virtual space entry. The target user account is any of the at least one sixth user account. The plurality of first user accounts are user accounts issuing first interaction data in the virtual space, the at least one sixth user account is a user account screened based on the screening condition, and the plurality of first user accounts and the at least one sixth user account include at least one same user account. For example, the plurality of first user accounts and the at least one sixth user account all include the target user account. If the screening condition is used to screen a user account that belongs to the same city as the second user account, based on the screening condition, the second terminal screens at least one sixth user account that belongs to the same city as the second user account and a virtual space entry corresponding to each sixth user account. Alternatively, if the screening condition is used to screen a user account having a certain type tag, based on the screening condition, the second terminal screens at least one sixth user account having the certain type tag and a virtual space entry corresponding to each first user account. The type tag indicates a type to which a corresponding user account belongs. For example, the type tag is a gender tag, an occupation tag, or the like.

In some embodiments, a target application is installed on the second terminal and the step 401 includes: logging on to the target application based on the second user account via the second terminal, displaying the virtual space entry corresponding to the target user account based on the target application, sending a data acquiring request to the server via the target application in response to the trigger operation on the virtual space entry, sending, by the server, a plurality of pieces of first interaction data issued in a virtual space indicated by the virtual space identifier to the second terminal based on a virtual space identifier carried in the data acquiring request, and receiving, by the second terminal, the plurality of pieces of first interaction data sent by the server.

The server is used to provide a service for the target application. For example, the target application is a live streaming application, and the server is a live streaming server.

In step 402, the second terminal acquires second matching degrees among the plurality of first user accounts and a second user account.

The second user account is an account logged on to the second terminal. The second matching degree corresponding to any first user account is used to indicate a matching degree between the first user account and the second user account, and further indicate a possibility that the second user account likes the first user account. For example, the second matching degree between the first user account and the second user account is a match index (MI). For any first user account, a larger second matching degree between the first user account and the second user account indicates a higher possibility that the second user account likes the interaction data corresponding to the first user account.

In some embodiments, step 402 includes steps 4021 to 4023.

In step 4021, a type tag corresponding to each of the first user accounts and a type tag corresponding to the second user account are acquired.

The type tag is used to indicate a type to which a corresponding user account belongs. For example, the type tag is game enthusiast, makeup enthusiast, or the like. In some embodiments, each first user account corresponds to one or more type tags; and the second user account corresponds to one or more type tags. When each first user account corresponds to a plurality of type tags, the plurality of type tags corresponding to different first user accounts may be different. For example, the plurality of type tags corresponding to one first user account include singing enthusiast and game enthusiast, and the plurality of type tags corresponding to another first user account include makeup enthusiast, sports enthusiast, and the like.

In some embodiments, acquiring the type tag corresponding to the second user account includes: acquiring account information of the second user account, performing information extraction on the account information of the second user account and acquiring the type tag corresponding to the second user account.

The account information of the second user account is used to describe information about the second user account. In some embodiments, the account information of the second user account includes at least one of personalized setting information or account history information of the second user account. The personalized setting information is used to indicate a personalized preference setting of the second user account. For example, the personalized setting information includes whether to switch virtual spaces based on a sliding up or down operation, whether to enable a special effect for entering a virtual space, whether to enable pop-up display when exiting a virtual space, and the like. For another example, the personalized setting information is personalized setting data (PSD). The account history information includes history information of interaction data watched by the second user account, and can reflect a like of the second user account. For example, the account history information includes history records of the interaction data watched by the second user account, records of giving gifts, records of liking interaction data, and the like. For example, the account history information is historical behavior data (HBD).

In some embodiments, acquiring the type tags corresponding to each of the first user accounts includes: receiving, by the second terminal, the type tag corresponding to each first user account sent by the server.

In this embodiment of the present disclosure, the server stores the type tags corresponding to each first user account. The second terminal interacts with the server and can acquire the type tags corresponding to each first user account stored in the server. The type tags corresponding to each first user account is acquired by performing information extraction on the account information of each first user account by the server. In some embodiments, the account information of the first user account includes at least one of personalized setting information and historical live streaming information of the first user account. The personalized setting information is used to indicate a personalized preference setting of the first user account. The historical live streaming information can describe a data type of historical interaction data of the first user account, live streaming time, a like of the first user account, and the like.

In a possible implementation of the foregoing embodiment, the second terminal sends a data acquiring request to a server in response to an access operation on a virtual space. The server sends a plurality of pieces of first interaction data issued in a virtual space indicated by the virtual space identifier and type tags corresponding to each first user account issuing the first interaction data in the virtual space to the second terminal based on the virtual space identifier carried in the data acquiring request. The second terminal receives the plurality of pieces of first interaction data and the type tags corresponding to each first user account sent by the server.

In step 4022, the second terminal determines a first number corresponding to each first user account.

The first number is the number that the type tags that correspond to the first user account are the same as the type tags corresponding to the second user account.

After acquiring the type tags corresponding to each first user account and the type tags corresponding to the second user account, the second terminal compares the type tags corresponding to the first user accounts with the type tags corresponding to the second user account one by one, to determine the first number corresponding to each first user account is determined.

In step 4023, the second terminal determines a second matching degree between each of the first user accounts and the second user account based on the first number corresponding to the first user account.

For any first user account, the first number reflects a similarity between the first user account and the second user account, and can also reflect the second user account's liking level of the first user account. The second matching degree between each of the first user accounts and the second user account is determined based on the first number corresponding to the first user account, thereby ensuring that the larger number of same type tags is, the larger second matching degree between a corresponding first user account and the second user account is, and the smaller number of same type tags is, the smaller second matching degree between a corresponding first user account and the second user account is.

Because the first number corresponding to each first user account indicates a similarity between the first user account and the second user account, the second matching degree between each of the first user accounts and the second user account is determined based on the first number corresponding to the first user account, thereby ensuring accuracy of the second matching degree.

In some embodiments, the step 4023 includes: for any first user account, determining a ratio of the first number corresponding to the first user account to a second number as the second matching degree between the first user account and the second user account. The second number is the number of type tags corresponding to the second user account.

For example, if the first number corresponding to the first user account is 4 and the number of the type tags corresponding to the second user account is 10, the second matching degree between the first user account and the second user account is 0.4.

In step S403, the second terminal determines first matching degree corresponding to each piece of first interaction data based on the second matching degree between each of the first user accounts and the second user account.

For any interaction data, the first matching degree is used to indicate a matching degree between a first user account corresponding to the first interaction data and the second user account, and/or the interaction on the first interaction data performed by a third user account accessing the virtual space.

A plurality of third user accounts can access the virtual space. Interactions on the first interaction data performed by the third user accounts accessing the virtual space reflect how much the plurality of third user accounts like the first interaction data. For example, the interactions on the first interaction data performed by the third user accounts are expressed as performing operations such as liking, commenting and resource transferring, or the like on the first interaction data, the interactions on the first interaction data performed by the third user accounts accessing the virtual space can reflect how much the plurality of third user accounts like the first interaction data, and can also indicate a possibility that the second user account likes the first interaction data. A matching degree between the first user account and the second user account reflects a possibility that the second user account likes the first user account. Therefore, a first matching degree corresponding to any first interaction data can reflect a possibility that the second user account likes the first interaction data. For any first interaction data, a larger second matching degree between the first user account corresponding to the first interaction data and the second user account indicates a higher possibility that the second user account likes the first interaction data.

Because the second matching degree corresponding to each first user account can reflect how much the second user account's likes each first user account, and how much the second user account's likes the first interaction data corresponding to each first user account. The first matching degree corresponding to each piece of first interaction data are determined based on the second matching degree between each of the first user accounts and the second user account, such that a corresponding second matching degree is integrated into each first matching degree. Due to an impact on the second matching degree between the first user account and the second user account has been taken into consideration, accuracy of acquiring the first matching degree is guaranteed.

In some embodiments, the access operation is triggered based on a virtual space entry corresponding to a target user account; and step 403 includes steps 4031 to 4033 as follows.

In step 4031, the second terminal receives a weight of each piece of first interaction data sent by the server.

In this embodiment of the present disclosure, the trigger operation on the virtual space entry corresponding to the target user account is an access operation on a virtual space indicated by the virtual space entry; and the target user account is any of the plurality of first user accounts. The server stores a weight of each piece of interaction data. The weight of each piece of first interaction data is used to indicate how much a plurality of third user accounts like the first interaction data. A larger weight of the first interaction data indicates a larger number of third user accounts like the first interaction data.

In some embodiments, the weight of each piece of first interaction data received by the second terminal is an initial weight. The initial weight of each piece of first interaction data is a fixed value and is configured by an administrator.

In a possible implementation of the foregoing embodiment, initial weights of a plurality of pieces of first interaction data are the same. For example, initial weights of a plurality of pieces of interaction data are 1.

It should be noted that, in this embodiment of the present disclosure, the weight of the first interaction data is acquired via interactions between the second terminal and the server. In another embodiment, the step 4031 does not need to be performed, and the weight of each piece of first interaction data can be acquired in another manner.

In step 4032, the second terminal adjusts a weight of target interaction data based on a relationship between the target user account and the second user account.

The target interaction data corresponds to the target user account. Because the operation of accessing the virtual space by the second terminal is implemented based on the virtual space entry corresponding to the target user account, there may be a relationship between the target user account and the second user account. Considering the relationship between the target user account and the second user account, which may affect the second user account's liking of the target interaction data, the weight of the target interaction data is adjusted based on the relationship between the target user account and the second user account to guarantee the accuracy of the adjusted weight.

In some embodiments, the step 4032 includes: determining a third increase amplitude of the target interaction data based on whether the target user account is the first user account that the second user account follows.

The third increase amplitude is any value. For example, the third increase amplitude is 1, 2, or 3.

As the relationship between the target user account and the second user account can reflect how much the second user account likes the target interaction data, and different relationships may reflect different levels of liking, for different relationships, the weight of the interaction data is adjusted by using different increase amplitudes. If the target user account is a user account that the second user account follows, a possibility that the second user account likes target interaction data corresponding to the target user account is high and an acquired third increase amplitude is large. If the target user account is not a user account that the second user account follows, a possibility that the second user account likes the target interaction data is low and the acquired third increase amplitude is small.

Because the relationship between the target user account and the second user account can reflect how much the second user account likes the target interaction data, the weight of the target interaction data is increased by using different increase amplitudes depending on whether the target user account is a first user account that the second user account follows, which shows that different relationships may reflect different levels of liking to guarantee adjusting accuracy of the weight.

In a possible implementation of the foregoing embodiment, determining the third increase amplitude includes: in a case that the target user account is not the first user account that the second user account follows and the virtual space entry is obtained by searching based on the target user account, determining a first value as the third increase amplitude of the target interaction data; and in a case that the target user account is not the first user account that the second user account follows and the virtual space entry corresponding to the target user account is a virtual space entry that corresponds to the target user account in a user account screened based on a screening condition, determining a second value as the third increase amplitude of the target interaction data.

The first value is larger than the second value. The screening condition is used to screen a user account. For example, the screening condition includes a city where the user account is located, a gender, and a data type to which corresponding interaction data belongs.

For example, a user account which belongs to the same city as the second user account is screened based on the screening condition, such that the target user account and the second user account belong to the same city.

In a case that the target user account is not the first user account that the second user account follows, if the virtual space entry is obtained by searching based on the target user account, that is, the second user account obtains the virtual space entry by searching based on the target user account, it means that the second user account wants to view the target interaction data corresponding to the target user account, and the purpose of viewing is clear. If the virtual space entry corresponding to the target user account is obtained by screening based on the screening condition, it means that the second user account only wants to view interaction data in a virtual space where user accounts that meet the screening condition are located, and the target user account may be any of a plurality of user accounts that meet the screening condition and does not have a close relationship with the second user account. Therefore, the first value is larger than the second value, such that different relationships between the first user account and the second user account can have different impacts on the second user account's liking level of interaction data.

When the target user account is not the first user account that the second user account follows, the weight of the target interaction data is adjusted by using different increase amplitudes depending on different relationships between the target user account and the second user account, such that different relationships between the first user account and the second user account have different impacts on the second user account's liking level of the first interaction data to guarantee adjusting accuracy of the weight.

In a possible implementation of the foregoing embodiment, determining the third increase amplitude includes: if the target user account is a user account that the second user account follows, determining a seventh value as the third increase amplitude of the target interaction data.

The seventh value is larger than the first value so as to reflect an impact of the relationship between the first user account and the second user account to the weight of the interaction data.

In step 4033, the first matching degree corresponding to each piece of first interaction data are determined based on the second matching degree between each of the first user accounts and the second user account, an adjusted weight of the target interaction data and a weight of fifth interaction data.

The fifth interaction data is interaction data included in the plurality of pieces of first interaction data but different from the target interaction data. After the second matching degree between each first user account and the second user account as well as the weight of the first interaction data corresponding to each first user account is acquired, first matching degree corresponding to each piece of first interaction data are respectively determined based on the second matching degree corresponding to each first user account and the weight of each piece of first interaction data. In other words, an impact on the second user account's liking level of the first user account is considered during a process of determining the first matching degree, such that accuracy of acquiring the first matching degree is guaranteed.

In some embodiments, the step 4033 includes: determining a sum value of the adjusted weight of the target interaction data and the weight of the fifth interaction data; determining a first ratio of the adjusted weight of the target interaction data to the sum value and a second ratio of the weight of the fifth interaction data to the sum value; determining a product of a second matching degree corresponding to the target user account and the first ratio as a first matching degree corresponding to the target interaction data; and determining a product of a second matching degree corresponding to the fifth interaction data and the second ratio as a first matching degree corresponding to the fifth interaction data.

The second matching degree corresponding to the fifth interaction data is a matching degree between the first user account corresponding to the fifth interaction data and the second user account.

A sum value of weights of the plurality of pieces of first interaction data is determined. The first ratio and the second ratio are determined based on the weight of each piece of first interaction data. A first matching degree corresponding to each piece of first interaction data is determined based on the first ratio, the second ratio, and the second matching degree corresponding to each first user account, such that a proportion of the weight of the first interaction data to the sum value of the weights of the plurality of pieces of first interaction data is integrated into the first matching degree. In addition, an impact of a matching degree between the first user account and the second user account is taken into consideration, such that the plurality of pieces of first interaction data can be distinguished based on the first matching degree to guarantee accuracy of an acquired first matching degree.

In a possible implementation of the foregoing embodiment, for any first user account, the second matching degree between the first user account and the second user account, the weight of the first interaction data corresponding to the first user account, the sum value of the weights of the plurality of pieces of first interaction data, and the first matching degree corresponding to the first interaction data corresponding to the first user account conform to the following relationship:

$$F(x) = \frac{P_i}{P_{total}} \cdot MI,$$

wherein

F (x) is used to represent a first matching degree corresponding to first interaction data corresponding to an $i_{th}$ first user account; $P_i$ is used to represent the weight of the first interaction data corresponding to the $i_{th}$ first user account; $P_{total}$ is used to represent a sum value of the weights of the plurality of pieces of first interaction data; and MI is used to represent a second matching degree between the $i_{th}$ first user account and the second user account.

It should be noted that, in this embodiment of the present disclosure, the plurality of pieces of first interaction data are firstly acquired and then the first matching degree corresponding to each piece of first interaction data is determined based on the second matching degree between each first user account and the second user account. In another embodiment, steps 401 to 403 do not need to be performed, and the plurality of pieces of first interaction data issued in the virtual space and the first matching degrees corresponding to each piece of first interaction data can be acquired in another manner in response to the access operation on the virtual space.

In step 404, the second terminal simultaneously plays at least two pieces of second interaction data among the plurality of pieces of first interaction data on a playing interface of the virtual space based on the first matching degrees corresponding to the plurality of pieces of first interaction data, such that manners of playing the second interaction data having different first matching degrees are different.

Each piece of second interaction data is interaction data among the plurality of pieces of first interaction data. The play manner is a manner of playing the interaction data. In some embodiments, the play manner indicates a size, a position, or the like of a playing region for playing the second interaction data.

Because the first matching degree corresponding to each piece of first interaction data indicates a possibility that the second user account likes the first interaction data, second interaction data having different first matching degrees is played in different manners, such that second interaction data that is being played matches the second user account, thereby highlighting the second interaction data that meets the second user account's likes, realizing a personalized play and improving the play effect. thereby realizing In some embodiments, the first interaction data includes multimedia data, and the step 404 includes: simultaneously playing, by the second terminal, at least two pieces of first multimedia data among a plurality of pieces of multimedia data on a playing interface of the virtual space based on first matching degrees corresponding to the plurality of pieces of multimedia data, such that manners of playing first multimedia data having different first matching degrees are different. For example, playing regions corresponding to multimedia data having different first matching degrees have different sizes.

In some embodiments, the first interaction data includes virtual resource data, and step 404 includes: simultaneously playing, by the second terminal, at least two pieces of first virtual resource data among a plurality of pieces of virtual resource data on a playing interface of the virtual space based on first matching degrees corresponding to the plurality of pieces of virtual resource data, such that manners of playing first virtual resource data having different first matching degrees are different.

For example, for at least two pieces of first virtual resource data that are selected for playing, at least two pieces of first virtual resource data having a larger first matching degree are directly displayed on the playing interface, such that a user can acquire a corresponding resource by clicking on the first virtual resource data. Other virtual resource data in the plurality of pieces of virtual resource data except the first virtual resource data is displayed in a list. When the user clicks on the other virtual resource data in the list, the other virtual resource data is displayed on the playing interface.

In some embodiments, step 404 includes steps 4041 and 4042.

In step 4041, at least two pieces of second interaction data having a larger first matching degree is selected from the plurality of pieces of first interaction data based on the first matching degrees.

The second interaction data is the first interaction data with a larger first matching degree. That is, a first matching degree corresponding to each piece of second interaction data is greater than a first matching degree corresponding to other interaction data. The other interaction data is interaction data in the plurality of pieces of first interaction data except the second interaction data.

In some embodiments, step 4041 includes: determining an average value of the first matching degrees corresponding to the plurality of pieces of first interaction data; and selecting at least two pieces of second interaction data having the greater first matching degree from the plurality of pieces of first interaction data based on the average value of the first matching degrees corresponding to the plurality of pieces of first interaction data, where a first matching degree corresponding to each of the at least two pieces of second interaction data is larger than the average value.

The average value of the first matching degrees corresponding to the plurality of pieces of first interaction data is used to measure the second user account's liking level of the plurality of pieces of first interaction data. The at least two pieces of second interaction data having the larger first matching degree are selected from the plurality of pieces of first interaction data, and the first matching degree corresponding to each of the at least two pieces of second interaction data is larger than the average value, such that the at least two pieces of second interaction data are all interaction data that meet the second user account's likes among the plurality of pieces of first interaction data, and to ensure to subsequently play the interaction data that meets the second user account's likes.

In step 4042, at least two pieces of second interaction data are simultaneously played on the playing interface of the virtual space.

Simultaneously playing at least two pieces of second interaction data in the virtual space, namely, simultaneously playing interaction data corresponding to a plurality of first user accounts for the second user account, enriches manners of playing the playing interface and improves appeal to audiences.

In some embodiments, the playing interface includes at least two playing regions of different sizes, and step 404 includes: playing at least two pieces of second interaction data in at least two playing regions of the playing interface respectively based on the first matching degrees corresponding to the plurality of pieces of first interaction data, such that the bigger the playing region, the larger the first matching degree of second interaction data played in the playing region.

Each playing region is used to play one piece of interaction data. In other words, when the playing interface includes two or more playing regions of different sizes, two or more pieces of interaction data can be simultaneously played on the playing interface. At least two playing regions have different sizes. For example, a first playing region is a region accounting for 40% of an entire playing interface; a second playing region is a region accounting for 30% of the entire playing interface; and a third playing region is a region accounting for 20% of the entire playing interface. For another example, the first playing region is located at an upper left corner of the playing interface; the second playing region is located at an upper right corner of the playing interface; and the third playing region is located at a lower left corner of the playing interface.

For example, the second interaction data includes multimedia data. The multimedia data included in the at least two pieces of second interaction data is played in the at least two playing regions, so as to show an effect of playing a plurality of pieces of multimedia data in playing regions of different sizes.

Because the first matching degree corresponding to each piece of first interaction data can reflect how much the second user account likes the first interaction data, a first live streaming video is played in each of playing regions of different sizes based on sizes of first matching degrees corresponding to the first interaction data. In addition, the larger size of the playing region where the second interaction data is played, the larger first matching degree, thereby highlighting interaction data meeting the second user account's likes, that is, different pieces of interaction data are played when different second terminals access the same virtual space, and all second interaction data played by different second terminals meets the like of a second user account logged on to the second terminal, which realizes the personalized play and improves the play effect.

In a possible implementation of the foregoing embodiment, the playing interface further includes an account displaying region, and the data play method further includes: displaying one or more fourth user accounts corresponding to fourth interaction data in the account displaying region.

The fourth interaction data is interaction data included in the plurality of pieces of first interaction data but different from the second interaction data; the fourth user account is a user account issuing the fourth interaction data; and a size of the account displaying region is smaller than a size of each playing region. For each piece of fourth interaction data, a first user account corresponding to the fourth interaction data is determined as the fourth user account. All fourth user accounts corresponding to the fourth interaction data are displayed in the account displaying region of the playing interface, such that the second user account can subsequently select a fourth user account corresponding to fourth interaction data to be played.

In a possible implementation of the foregoing embodiment, a first user account list is displayed in the account displaying region which includes a fourth user account.

In a possible implementation of the foregoing embodiment, when the fourth user account is displayed in the account displaying region, the method further includes the following two manners.

Manner 1: in response to a drag operation on any fourth user account in the account displaying region and the drag operation being released in any playing region, the second interaction data played in the playing region is replaced with the fourth interaction data.

When it is detected that a drag operation is performed on any fourth user account in the account displaying region and the drag operation is released in any playing region, it means that the second user account wants to play interaction data corresponding to the fourth user account, and replace the second interaction data being played in the playing region. Therefore, the second interaction data being played in the playing region is replaced with the fourth interaction data corresponding to the fourth user account. This manner enriches play manners on the playing interface, facilitates an audience to select interaction data to be played, and improves convenience of the playing interface.

Manner 2: in response to a trigger operation on any fourth user account in the account displaying region, the fourth interaction data corresponding to the fourth user account is played on the playing interface.

If a trigger operation is performed on any fourth user account in the account displaying region, it means that an audience wants to play the fourth interaction data corresponding to the fourth user account and thus the fourth interaction data is played on the playing interface. This manner enriches play manners on the playing interface, facilitates the audience to select interaction data to be played, and improves convenience of the playing interface.

In some embodiments, the manner 2 includes: in response to the trigger operation on the fourth user account, a pop-up window is displayed on the playing interface and the fourth interaction data corresponding to the fourth user account is played in the pop-up window.

The pop-up window can be displayed as a full-screen pop-up window or a partial pop-up window. When the trigger operation on the third user account is detected, and at least two pieces of second interaction data are played on the playing interface, the fourth interaction data corresponding to the selected fourth user account is played in the form of a pop-up window, which enriches play manners of the playing interface, and improves the play effect.

In a possible implementation of the foregoing embodiment, when the fourth interaction data is played in the pop-up window and a playing duration of the fourth interaction data reaches a target duration, the display of the pop-up window and the play of the fourth interaction data are cancelled.

The target duration is any duration. For example, the target duration is 30 seconds, 40 seconds, or the like. When the playing duration of the fourth interaction data reaches the target duration, the display of the pop-up window and the play of the fourth interaction data are automatically cancelled, thereby realizing the effect of previewing the play of the fourth interaction data, enriching the play manners of the interface, and improving the play effect.

In some embodiments, after manner 2 is performed, the data play method further includes any one of the following items:

Item 1: in response to detection of a confirmation operation on the fourth interaction data during a process of playing the fourth interaction data, the second interaction data played in a playing region with the smallest size is replaced with the fourth interaction data.

If the confirmation operation on the fourth interaction data is detected during the process of playing the fourth interaction data, it means that the second user account wants to play the fourth interaction data in a playing region of the playing interface and thus the second interaction data played in the playing region with the smallest size is replaced with the fourth interaction, that is, second interaction data having a minimum first matching degree among at least two pieces of second interaction data currently played in the playing interface is replaced with the fourth interaction data. This manner not only ensures that the currently played second interaction data matches the second user account as far as possible, but also enables the second user account to autonomously select fourth interaction data to be played, thereby improving convenience and flexibility.

In some embodiments, a confirmation option is also displayed when the fourth interaction data is played on the playing interface, and the item 1 includes: in response to a trigger operation on the confirmation option being detected, the second interaction data played in the playing region with the smallest size is replaced with the fourth interaction data, and the confirmation option is a button, a slider, or the like.

Item 2: in response to the playing duration of the fourth interaction data reaching the target duration, the second interaction data played in the playing region with the smallest size is replaced with the fourth interaction data.

The target duration is any duration. After the playing duration of the fourth interaction data reaches the target duration, the second interaction data played in the playing region with the smallest size is automatically replaced with the fourth interaction data, thereby realizing automatic switching of interaction data and improving convenience.

When the fourth user account is displayed in the account displaying region, the fourth interaction data to be played in the playing region can be selected in the foregoing two manners. Then, in some embodiments, the data play method further includes: in the account displaying region, a first user account corresponding to the replaced second interaction data is displayed.

In this embodiment of the present disclosure, for a plurality of pieces of first interaction data in the virtual space, in addition to the second interaction data played in at least two playing regions of the playing interface, all first user accounts corresponding to other interaction data are displayed in the account displaying region, that is, after the interaction data in the playing region is replaced, an account corresponding to the replaced interaction data is displayed in the account displaying region.

It should be noted that, the foregoing embodiment is described based on the playing interface including at least two playing regions and the account displaying region. However, in another embodiment, at least two pieces of second interaction data can be directly played on the playing interface. In addition, on this basis, during a process of displaying the second interaction data on the playing interface, the data play method further includes steps 4043 and 4044.

In step 4043, one or more fourth user accounts corresponding to fourth interaction data are also displayed on the playing interface.

In step 4044, in response to a trigger operation on any fourth user account, the fourth interaction data is played on the playing interface.

In some embodiments, the step 4044 includes: in response to the trigger operation on the fourth user account, a pop-up window is displayed on the playing interface and the fourth interaction data corresponding to the fourth user account is played in the pop-up window.

In step 4045, the playing of the fourth interaction data is cancelled after the playing duration of the fourth interaction data reaches the target duration.

It should be noted that, the foregoing process described in steps 4043 to 4045 is similar to the foregoing process of previewing the fourth interaction data corresponding to the fourth user account on the basis of displaying the third user account in the account displaying region. Details are not described herein again.

It should be noted that, the foregoing steps 4044 and 4045 are both optional solutions. In another embodiment, after step 4043 is performed, steps 4044 and 4045 may be skipped; or after steps 4043 and 4044 are performed, step 4045 is skipped.

In step 405, in response to an interaction operation on any second interaction data being played, the second terminal adjusts the second matching degrees between the plurality of first user accounts and the second user account.

The interaction operation is an operation performed by the second user account for interacting with the played second interaction data, namely, an interaction operation performed by the second user account on a first user account corresponding to the played second interaction data. For example, the interaction operation is a like giving operation, a resource transferring operation, or the like. For another example, the resource transferring operation is a gift giving operation, a red packet giving operation, or the like.

The second user account performing an interaction operation on any second interaction data means that the second interaction data meets the like of the second user account. Therefore, in response to the interaction operation on the second interaction data, the second matching degrees between the plurality of first user accounts and the second user account are adjusted so that the first matching degrees corresponding to the first interaction data are subsequent redetermined based on adjusted second matching degrees to ensure that first matching degrees corresponding to the redetermined first interaction data meet the second user account's liking level of the interaction data, thereby ensuring the accuracy of the subsequently determined first matching degrees.

In some embodiments, step 405 includes: based on the number of the interaction operation on any second interaction data being played, determining a fourth increase amplitude of the second matching degree corresponding to the second interaction data; determining a ratio of the fourth increase amplitude to a third number as a decrease amplitude; increasing the second matching degree corresponding to the second interaction data based on the fourth increase amplitude; and decreasing a second matching degree corresponding to eleventh interaction data based on the decrease amplitude.

The second matching degree corresponding to the second interaction data is the matching degree between the first user account corresponding to the second interaction data and the second user account. The third number is the number of pieces of interaction data that are different from the target interaction data among the plurality of pieces of first interaction data. The eleventh interaction data is interaction data among the plurality of pieces of first interaction data and different from the second interaction data. The second matching degree corresponding to the eleventh interaction data is the matching degree between the first user account corresponding to the eleventh interaction data and the second user account. The fourth increase amplitude is any value. For example, the fourth increase amplitude is 0.1, 0.3, or the like. The decrease amplitude is any value, too. The fourth increase amplitude is a multiple of the decrease amplitude.

That the second user account interacts more with any second interaction data indicates that the second user account likes more the second interaction data. Compared with the second interaction data, the second user account may dislike eleventh interaction data among the plurality of pieces of first interaction data except the second interaction data. Therefore, based on the number of interaction operations on the second interaction data, the second matching degree corresponding to the second interaction data is increased, and the second matching degree corresponding to the eleventh interaction data is decreased to ensure that the adjusted second matching degree meets the second user account's liking level of the plurality of pieces of first interaction data, namely meeting the second user account's liking level of the plurality of first user accounts and the accuracy of the adjusted second matching degree is ensured.

In a possible implementation of the foregoing embodiment, a process of determining the fourth increase amplitude includes: when the interaction operation is a like giving operation, a product of an eighth value and the number of the like giving operation is determined as the fourth increase amplitude; and when the interaction operation is a resource transferring operation, a product of a ninth value and the number of resources corresponding to the resource transferring operation is determined as the fourth increase amplitude. Both the eighth value and the ninth value are any values.

For example, in a process of displaying at least two pieces of second interaction data on the playing interface, if a trigger operation on any playing region, where the second interaction data is played, is detected, it indicates that a like giving operation on the second interaction data is detected.

For another example, in a process of displaying at least two pieces of second interaction data on the playing interface, a playing region playing each piece of second interaction data further displays a resource transferring option. When a trigger operation on a resource transferring option corresponding to any second interaction data is detected, a resource transfer input region and a confirmation option are displayed. The resource transfer input region is used to input a resource number. A trigger operation on the confirmation option indicates that a resource transferring operation on the second interaction data is detected.

For still another example, in a process of displaying at least two pieces of second interaction data on the playing interface, the playing interface further displays a resource transferring option. When a trigger operation on a resource transferring option corresponding to any second interaction data is detected, a first user account corresponding to the currently played at least two pieces of second interaction data, a resource transfer input region, and a confirmation option are displayed. The resource transfer input region is used to input a resource number. When a first user account corresponding to any second interaction data is selected, a resource number input in the resource transfer input region is acquired in response to a trigger operation on the confirmation option, and this indicates that a resource transferring operation on the second interaction data is detected and resources of the resource number are transferred to the first user account corresponding to the second interaction data.

In step 406, the second terminal re-determines first matching degree corresponding to each piece of first interaction data based on an adjusted second matching degree between each of the first user accounts and the second user account.

A first matching degree corresponding to each piece of first interaction data is re-determined based on the adjusted second matching degree, such that interaction data being played can be subsequently adjusted based on the re-determined first matching degree, thereby realizing a solution of real-time adjustment to the interaction data being played. Step 406 is similar to step 403. Details are not described herein again.

It should be noted that, this embodiment of the present disclosure is described by using an example in which the second matching degree is adjusted before the first matching degree. In another embodiment, steps 405 and 406 do not need to be performed, and the first matching degree corresponding to the first interaction data can be adjusted in another manner.

In some embodiments, in the process of displaying at least two pieces of second interaction data, adjusting the first matching degree corresponding to each piece of first interaction data further includes the following four manners.

Manner 1: increasing the first matching degree corresponding to the second interaction data in response to an interaction operation on any second interaction data.

In a process of the second terminal displaying at least two pieces of second interaction data on the playing interface, an interaction operation on any second interaction data indicates that the second user account likes the first interaction data. Therefore, the first matching degree corresponding to the second interaction data is increased, such that an increased first matching degree meets the second user account's liking level of the second interaction data, thereby ensuring accuracy of the first matching degree.

In some embodiments, increasing the first matching degree corresponding to the second interaction data includes at least one of the following items.

Item 1: increasing the first matching degree corresponding to the second interaction data by a third value in response to a like operation on the second interaction data.

Item 2: in response to a resource transfer operation on the first user account corresponding to the second interaction data, determining a product of the number of resources corresponding to the resource transfer operation and a fourth value as a fifth value, and increasing the first matching degree corresponding to the second interaction data by the fifth value.

Both the third value and the fourth value are any values. For example, the third value and the fourth value are 0.01. It should be noted that, the foregoing two items can be combined. In a process of playing the second interaction data, a sum value of the third value and the fifth value is determined with reference to manners described in the foregoing two items, and the first matching degree corresponding to the second interaction data is increased based on the sum value. According to a variety of different interaction operations, first matching degrees corresponding to interaction data are adjusted by different increase amplitudes, which enriches adjustment methods of the first matching degree so as to ensure that the adjusted first matching degree meets a real like of the second user account and guarantee adjustment accuracy.

In addition, after increasing the first matching degree corresponding to the second interaction data, the data play method further includes: sending, by the second terminal, an update message to the server, the server forwards the update message to another second terminal to which a fourth user account logs on, and the another second terminal increases the first matching degree corresponding to the second interaction data by a fifth increase amplitude based on the update message.

The update message carries the first user account corresponding to the second interaction data and a fifth increase amplitude of the first matching degree corresponding to the second interaction data. The fifth increase amplitude is an amplitude by which the first matching degree corresponding to the second interaction data is increased. The fourth user account is a user account that is of fourth user accounts accessing the virtual space and different from the second user account. After increasing the first matching degree corresponding to the second interaction data, the second terminal forwards, via the server, the update message to another second terminal accessing the virtual space, such that the another second terminal can synchronously adjust the first matching degree corresponding to the second interaction data.

In this embodiment of the present disclosure, for a plurality of second terminals accessing the same virtual space, interaction data received by each second terminal in the virtual space is synchronous. In addition, other information related to the interaction data is also synchronous. For example, if any second terminal performs an interaction operation on any interaction data once, 1 is added to the number of the interaction operation on the interaction data, and the another second terminal accessing the virtual space can also learn that 1 is added to the number of the interaction operation. Therefore, data synchronization for the plurality of second terminals accessing the same virtual space is implemented.

Because the second terminal adjusts the first matching degree corresponding to the second interaction data based on the interaction operation on the second interaction data, when the second terminal synchronizes the fifth increase amplitude of the first matching degree corresponding to the second interaction data to the another second terminal, the another second terminal can synchronously update the first matching degree corresponding to the second interaction data, thereby realizing data synchronization for the plurality of second terminals accessing the same virtual space. In addition, the second terminal directly synchronizes the fifth increase amplitude to the another second terminal, such that the another second terminal does not need to re-determine an increase amplitude of the first matching degree corresponding to the second interaction data based on the interaction operation any more, thereby saving resources of the another second terminal, and guaranteeing efficiency of data synchronization.

Manner 2: the second terminal increases the weight of the second interaction data in response to an interaction operation on any second interaction data; and re-determines the first matching degree corresponding to the second interaction data based on the second matching degree between the first user account corresponding to the second interaction data and the second user account as well as an increased weight of the second interaction data.

In some embodiments, a process of increasing the weight of the second interaction data based on the interaction operation includes: determining an increase amplitude of the weight of the second interaction data based on the number of the interaction operation on the second interaction data; and increasing the weight of the second interaction data based on the increase amplitude.

In a possible implementation of the foregoing embodiment, a process of determining the increase amplitude of the weight of the second interaction data includes at least one of the following items:

in response to the number of a like giving operation on the second interaction data, determining a product of the number of the like giving operation and a first unit weight as the increase amplitude of the weight of the second interaction data; and in response to a resource transferring operation on the second interaction data, determining a product of the number of resources corresponding to the resource transferring operation and a second unit weight as the increase amplitude of the weight of the second interaction data.

Both the first unit weight and the second unit weight are any values. The first unit weight is used to indicate a weight by which the weight of the second interaction data is increased after the like giving operation is performed on the second interaction data once. The second unit weight is used to indicate a weight by which the weight of the second interaction data is increased after a unit number of resource transferring operations are performed on the second interaction data.

In manner 2, a process of re-determining the first matching degree corresponding to the second interaction data based on the second matching degree between the first user account corresponding to the second interaction data and the second user account as well as an increased weight of the second interaction data is similar to step 4033. Details are not described herein again.

In some embodiments, after manner 2 is performed, the data play method further includes: sending, by the second terminal, the update message to the server, wherein the update message carries the first user account corresponding to any second interaction data and the increase amplitude of the weight of the first interaction data; forwarding, by the server, the update message to another second terminal to which the fourth user account logs on; increasing, by the another second terminal, the weight corresponding to the second interaction data by the increase amplitude based on the update message; and re-determining the first matching degree corresponding to the second interaction data based on a matching degree between the first user account corresponding to the second interaction data and the second user account logged on to another second terminal, and the increased weight of the second interaction data.

Manner 3: the second terminal receives the update message sent by the server, and increases the first matching degree corresponding to sixth interaction data by a target value based on update message.

The sixth interaction data corresponds to the first user account carried in the update message. The update message carries any first user account in the virtual space and the target value. The update message is sent by the another second terminal accessing the virtual space to the server after the first matching degree corresponding to any first interaction data is updated, and the update message is synchronized to a current second terminal by the server. After receiving the update message sent by server, the second terminal can determine the sixth interaction data indicated by the first user account based on the first user account carried in the update message, and increase the first matching degree corresponding to the sixth interaction data by the target value based on the target value carried in the update message, thereby realizing data synchronization for the plurality of second terminals accessing the same virtual space.

In some embodiments, the update message further carries a play time point. In this case, a process of updating the first matching degree corresponding to the fifth interaction data includes: increasing the first matching degree corresponding to sixth interaction data by the target value in response to the sixth interaction data reaching the play time point, based on the update message.

The play time point indicates a time point at which the first matching degree corresponding to the sixth interaction data is increased.

Different second terminals may have different degrees of network delays in a process of playing interaction data. Therefore, the first matching degree corresponding to the interaction data can be updated only when the interaction data reaches the play time point carried in the update message, thereby guaranteeing accuracy of data synchronization.

Manner 4: the second terminal receives the update message sent by the server, wherein the update message carries any first user account in the virtual space and a first increase amplitude, increases the weight of seventh interaction data by the first increase amplitude, and updates the first matching degree corresponding to the seventh interaction data based on the second matching degree corresponding to the first user account and the increased weight of the seventh interaction data.

The second matching degree corresponding to the first user account is a matching degree between the first user account and the second user account, and the seventh interaction data corresponds to the first user account.

In this embodiment of the present disclosure, the first matching degree corresponding to any first interaction data is acquired based on the second matching degree between the first user account corresponding to the first interaction data and the second user account as well as the weight of the first interaction data. In other words, a process of acquiring the first matching degree corresponding to each piece of first interaction data is similar to steps 4031 to 4033. In this case, after receiving the update message sent by the server, the second terminal increases, based on the update message, the weight of the first interaction data corresponding to the first user account carried in the update message; and after the weight is increased, updates the first matching degree corresponding to the first interaction data corresponding to the first user account, based on the second matching degree between the first user account and the second user account.

In some embodiments, the first increase amplitude carried in the update message is acquired by the server based on a weight of the seventh interaction data and a weight of the eleventh interaction data. The eleventh interaction data is interaction data that is among the plurality of pieces of first interaction data and belongs to the same data type as the seventh interaction data. In this case, after the second terminal receives the update message in the foregoing manner 4, the method further includes:

correspondingly storing the first user account and the first increase amplitude that are carried in the update message.

In this embodiment of the present disclosure, the server stores weights of a plurality of pieces of first interaction data issued in the virtual space. When it is determined that data types of any two pieces of first interaction data among the plurality of pieces of first interaction data are the same, the first increase amplitude is determined based on weights of the two pieces of first interaction data, such that the second terminal subsequently decreases, based on the first increase amplitude, a difference between first matching degrees corresponding to the two pieces of interaction data. Therefore, when playing the interaction data based on an adjusted first matching degree, the second terminal can show an effect of simultaneously playing interaction data having the same data type, which forms an effect of interaction data confrontation. However, this adjusting manner is used only to adjust weights of interaction data belonging to the same data type. After the adjustment, if a data type of any of the two pieces of interaction data changes, a difference between first matching degrees corresponding to the two pieces of interaction data does not need to be decreased any more. Subsequently, the increased first increase amplitude needs to be canceled. Therefore, after the update message is received, the first user account and the first increase amplitude that are carried in the update message are stored correspondingly to subsequently decrease the weight of the interaction data by the first increase amplitude. As the first user account and the first increase amplitude that are carried in the update message are stored correspondingly, the weight of the interaction data corresponding to the first user account can be adjust in a real-time manner subsequently based on the first user account and the increase amplitude that are stored correspondingly, which guarantees convenience of subsequent weight adjustment.

In a possible implementation of the foregoing embodiment, after the first user account and the first increase amplitude that are carried in the update message are stored correspondingly, the data play method further includes: receiving, by the second terminal, a cancel message sent by the server, wherein the cancel message carries any first user account; searching for the first increase amplitude stored corresponding to the first user account based on the first user account carried in the cancel message; decreasing the weight of the seventh interaction data by the first increase amplitude; and updating a first matching degree corresponding to the seventh interaction data based on the second matching degree corresponding to the first user account and a decreased weight of the seventh interaction data.

After the cancel message sent by the server is received, the first increase amplitude by which the weight of the seventh interaction data corresponding to the first user account is increased can be canceled based on the first user account carried in the cancel message and a relationship between the first user account and the increase amplitude, that is, the weight of the seventh interaction data corresponding to the first user account is restored.

In some embodiments, the first increase amplitude carried in the update message is acquired by the server based on the weight of the seventh interaction data and the weight of the eleventh interaction data. The eleventh interaction data is interaction data that is among the plurality of pieces of first interaction data and belongs to the same data type as the seventh interaction data. In this case, after manner 4 is performed, the method further includes: receiving a cancel message sent by the server, wherein the cancel message carries the first user account and the first increase amplitude; decreasing the weight of the seventh interaction data by the first increase amplitude based on the cancel message; and updating the first matching degree corresponding to the seventh interaction data based on the second matching degree corresponding to the first user account and a decreased weight of the seventh interaction data.

The first increase amplitude by which the weight of the seventh interaction data corresponding to the first user account is increased can be directly canceled based on the first user account and the first increase amplitude that are carried in the cancel message, that is, the weight of the seventh interaction data corresponding to the first user account is restored.

In step 407, when positions of the at least two pieces of second interaction data in a queue change, the second terminal selects at least two pieces of third interaction data having a larger first matching degree from the plurality of pieces of first interaction data based on the first matching degrees.

In the queue, the plurality of pieces of first interaction data are ranked in an ascending or descending order based on corresponding first matching degrees. The positions of the at least two pieces of second interaction data in a queue change, which indicates that the at least two pieces of second interaction data may not be interaction data having a larger first matching degree among the plurality of pieces of first interaction data; or a size sequence between first matching degrees corresponding to the at least two pieces of second interaction data changes.

In a process of playing the at least two pieces of second interaction data, the second terminal adjusts a first matching degree corresponding to each piece of first interaction data in real-time. If the positions of the at least two pieces of second interaction data in the queue change, at least two pieces of third interaction data having a larger first matching degree need to be selected according to a first matching degree corresponding to the plurality of pieces of current first interaction data, thereby ensuring that selected third interaction data matches the second user account.

In step 408, the second terminal simultaneously plays the at least two pieces of third interaction data on the playing interface.

The second terminal simultaneously plays the at least two pieces of selected third interaction data on the playing interface to ensure that the interaction data played by the second terminal matches the second user account. This achieves an effect of automatic switching of interaction data, and improves the play effect.

The data play method according to this embodiment of the present disclosure further provides a personalized recommendation system (JLPRS, Joint Live Personalized Recommendation System). The second terminal recommends second or third interaction data for the second terminal to play, according to steps 401 to 408 in the foregoing embodiments via the personalized recommendation system. This ensures that the interaction data played by the second terminal matches the second user account. In addition, based on the personalized recommendation system, the second terminal uses real-time behavioral data (LRBD, Live Real-time Behavioral Data) in the virtual space (for example, a like giving operation or a resource transferring operation) to adjust a weight of interaction data and a first matching degree corresponding to the interaction data. In addition, the server also combines non-precision interactive behavior (NIB, Non-precision Interactive Behavior) (for example, comments in the virtual space) to send an update message to the second terminal. The second terminal updates the weight of the interaction data and the corresponding first matching degree based on the personalized recommendation system and the update messages.

The data play method according to this embodiment of the present disclosure provides a multi-person joint interaction. During playing of a plurality of pieces of first interaction data issued in a multi-person joint interaction virtual space, second interaction data having different first matching degrees is played in different manners based on first matching degrees corresponding to the plurality of pieces of first interaction data, such that interaction data that is being played matches a second user account's like or interest, thereby highlighting the interaction data that matches the specific second user account, realizing personalized play and improving the play effect.

In addition, the second terminal accesses the virtual space to play interaction data matching the second user account. In a process of playing interaction data, the interaction data to be played can be adjusted in real-time to ensure that interaction data being played always matches the second user account and meet the like of the second user account, thereby enhancing stickiness of the virtual space, and prolonging duration in which the second user account views the interaction data in the virtual space.

Figure 5:
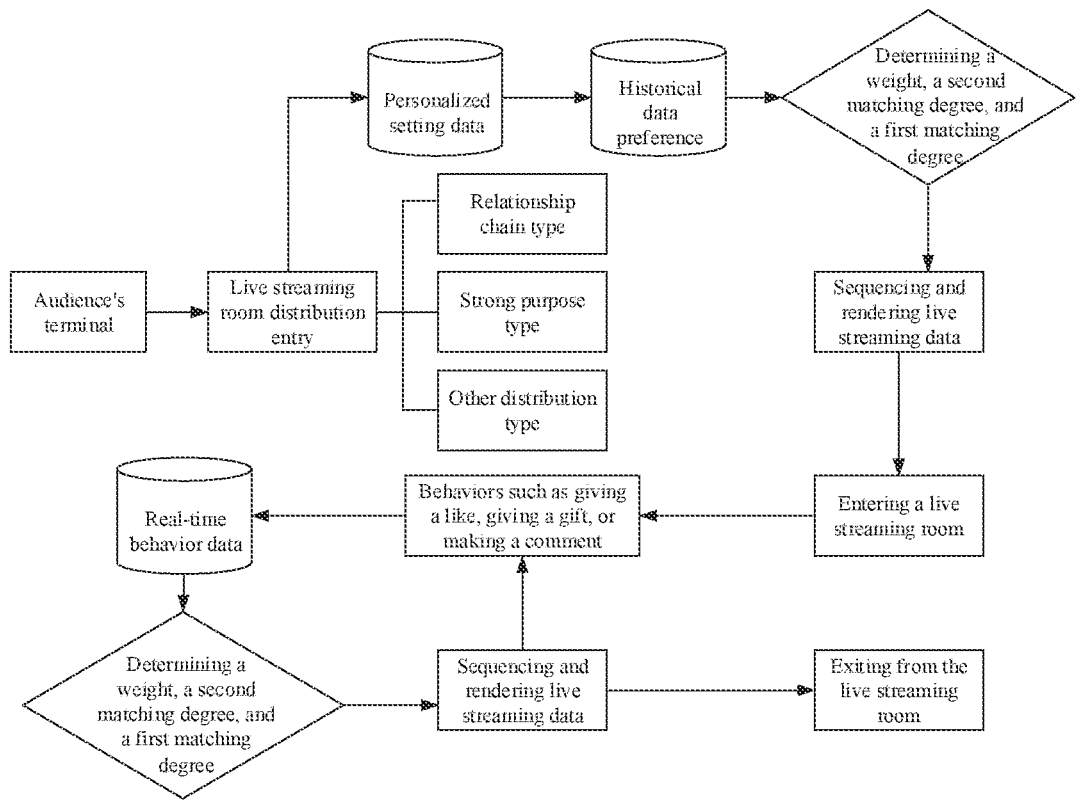
FIG. 5 is a flowchart of yet another data play method according to an embodiment of the present disclosure.

FIG. 5 is a flowchart of a data play method according to an embodiment. As shown in FIG. 5, the method includes the following steps.

Based on a live streaming room distribution entry, an audience's terminal to which an audience's account logs on selects a target live streaming room entry corresponding to a target anchor's account, acquires a plurality of pieces of live streaming data issued by a plurality of anchor's accounts in a target live streaming room indicated by a target live streaming room entry, determines a weight of each piece of live streaming data and a second matching degree between each anchor's account and the audience's account based on a type of a relationship between a target anchor's account corresponding to the target live streaming room entry and an audience's account, as well as personalized setting data and historical preference data of the audience's account, determines a first matching degree corresponding to each piece of live streaming data based on a determined weight and the second matching degree, select at least two pieces of first live streaming data having a larger first matching degree from the plurality of pieces of live streaming data based on a determined first matching degree, sequences and renders the selected first live streaming data, and plays the at least two pieces of first live streaming data on the playing interface after rendering, such that a the first live streaming data having a larger first matching degree is played in a playing region having a larger size.

In addition, in a process of playing the first live streaming data, the audience's account performs behaviors such as giving a like, giving a gift, or making a comment to live streaming data being played. A weight of each piece of live streaming data and a second matching degree between each anchor's account and the audience's account are updated based on real-time behavioral data of the audience's account. A first matching degree corresponding to each piece of live streaming data is re-determined based on the updated weight and second matching degree. Second live streaming data having a currently larger first matching degree is selected based on the updated first matching degree and is then sequenced and rendered. After rendering, at least two pieces of second live streaming data is played on the playing interface. The second live streaming data having the larger first matching degree is played in a playing region having a larger size. In this manner, live streaming data played on the playing interface can be updated in real-time to ensure that the live streaming data always meets the audience account's preference.

FIG. 6 is a flowchart of a data play method according to an embodiment. As shown in FIG. 6, the method is executed by a server and a second terminal and includes the following steps.

In step 601, the server acquires a plurality of pieces of first interaction data issued in a virtual space by a plurality of first user accounts and a weight of each piece of first interaction data.

The first user account has permission to issue multimedia data in the virtual space. The first interaction data includes the multimedia data. The first user account can not only issue multimedia data in the virtual space, but also send other data included in interaction data. For example, the virtual space is a live streaming room; the first user account is an anchor's account in the live streaming room; the anchor's account can issue interaction data in the live streaming room; and the interaction data includes live streaming data, comment data, virtual resource data, or the like.

In this embodiment of the present disclosure, each first user account represents one anchor. Each first user account issues one piece of first interaction data in the virtual space. A plurality of first user accounts issue a plurality of pieces of first interaction data in the same virtual space. In other words, the plurality of first user accounts interact in the same virtual space, thereby achieving an effect of multi-person joint interaction. The weight of each piece of first interaction data is used to indicate how much a third user account accessing the virtual space likes the first interaction data.

In some embodiments, step 601 includes: acquiring an initial weight of each piece of first interaction data; and updating the initial weights of the plurality of pieces of first interaction data based on a third update message sent by the plurality of second terminals.

The initial weight of each piece of first interaction data is a fixed value and is configured by an administrator. The third update message sent by each second terminal carries any first user account in the virtual space and an increase amplitude of an initial weight of any first interaction data corresponding to the first user account. The server updates the initial weight of each of first interaction data based on the third update message sent by the plurality of second terminals.

Based on the foregoing embodiment shown in FIG. 4, the second terminal updates a weight of interaction data in a process of playing interaction data in a virtual space, and sends an update message to the server, such that the server forwards the update message to another second terminal accessing the virtual space. The another second terminal performs synchronous update based on the update message. In addition, the server further updates initial weights of a plurality of pieces of interaction data stored locally based on received update messages.

In a possible implementation of the foregoing embodiment, a process of updating initial weights of a plurality of pieces of interaction data by the server includes: receiving, by the server, the third update message sent by any second terminal, wherein the third update message carries any first user account in the virtual space and a sixth increase amplitude; and increasing an initial weight of first interaction data corresponding to the first user account by the sixth increase amplitude based on the third update message.

The process of updating an initial weight of interaction data is similar to the process of updating interaction data by the second terminal in the embodiment shown in FIG. 4. Details are not described herein again.

In step 602, in a case that positions of the two pieces of eighth interaction data in a queue are not adjacent to each other, the server determines an adjustment amplitude corresponding to either of the two pieces of eighth interaction data based on a difference between weights of the two pieces of eighth interaction data.

The two pieces of eighth interaction data are any two pieces of first interaction data that belong to the same data type among the plurality of first interaction data. The adjustment amplitude is used to adjust a weight of the eighth interaction data to reduce a difference between weights of two pieces of eighth interaction data. In the queue, the plurality of pieces of first interaction data are ranked in an ascending or descending order based on weights. In this queue, any two pieces of interaction data of the same data type are not adjacent to each other, which indicates that there is a large difference between the weights of the two pieces of interaction data. Based on the difference between the weights of the two pieces of interaction data, the corresponding adjustment amplitude of any of the two pieces of interaction data is determined, such that the difference between the weights of the two pieces of interaction data can be decreased based on the adjustment amplitude.

In some embodiments, a process of determining the adjustment amplitude includes: determining an increase range of one piece of eighth interaction data whose weight is smaller between two pieces of eighth interaction data based on a difference between weights of the two pieces of eighth interaction data.

By determining the increase amplitude of the weight of the eighth interaction data with the smaller weight between the two pieces of eighth interaction data, the weight of the eighth interaction data with the smaller weight can be increased based on the increase amplitude, and the difference between the weights of the two pieces of eighth interaction data can be reduced.

In some embodiments, a process of determining the adjustment amplitude includes: determining a decrease amplitude of one piece of eighth interaction data whose weight is larger between two pieces of eighth interaction data based on a difference between weights of the two pieces of eighth interaction data.

By determining the decrease amplitude of the weight of the eighth interaction data with the larger weight between the two pieces of eighth interaction data, the weight of the eighth interaction data with the larger weight can be decreased based on the decrease amplitude, and the difference between the weights of the two pieces of eighth interaction data can be reduced.

In some embodiments, a process of determining the adjustment amplitude includes: determining a difference between a tenth value and a difference between weights of two pieces of eighth interaction data as an adjustment amplitude corresponding to each of the two pieces of eighth interaction data.

The tenth value is any value. For example, the tenth value is 0.01.

The difference between the tenth value and the difference between the weights of two pieces of eighth interaction data are determined as the adjustment amplitude corresponding to the eighth interaction data, so that after the weight of the eighth interaction data is subsequently adjusted based on the adjustment amplitude, weights of the two pieces of eighth interaction data are similar, and a weight order of the two pieces of eighth interaction data remains unchanged.

In some embodiments, a process of determining a data type of first interaction data includes: identifying contents of each piece of first interaction data, and determining a data type to which each piece of first interaction data belongs. The data type to which the first interaction data belongs indicates a data type to which the contents included in the first interaction data belongs. The data type of the first interaction data is determined in manner of contents identification to ensure the accuracy of the data type. Subsequently, eighth interaction data of the same data type can be determined based on the data type of the first interaction data.

In a possible implementation of the foregoing embodiment, contents of each piece of first interaction data are identified based on a type identification model to determine a data type to which each piece of first interaction data belongs. The type identification model is used to identify a data type to which interaction data belongs. For example, the type identification model is MMU (a network model).

It should be noted that, in this embodiment of the present disclosure, an adjustment amplitude corresponding to eighth interaction data in the plurality of pieces of first interaction data is determined based on the data type of the first interaction data. However, in other embodiment, step 602 does not need to be performed and the adjustment amplitude corresponding to the eighth interaction data can be determined based on ranking information of the plurality of pieces of first interaction data. The ranking information indicates that the plurality of pieces of first interaction data are ranked in an ascending or descending order based on weights. The eighth interaction data is any piece of first interaction data.

In step 603, the server sends a first update message to a plurality of second terminals accessing the virtual space, wherein the first update message carries a first user account corresponding to the eighth interaction data and the adjustment amplitude.

In step 604, each second terminal adjusts the weight of the eighth interaction data based on the adjustment amplitude carried in the first update message, adjusts a first matching degree corresponding to the eighth interaction data based on the matching degree between the first user account corresponding to the eighth interaction data and the second user account logged on to the second terminal as well as the adjusted weight of the eighth interaction data, and simultaneously plays at least two pieces of second interaction data on the playing interface of the virtual space based on the adjusted first matching degree, such that manners of playing the second interaction data having different first matching degrees are different, wherein the at least two pieces of second interaction data are first interaction data having a larger first matching degree among the plurality of pieces of first interaction data.

For example, the server detects that any two pieces of first interaction data in the virtual space are both of a dancing type, determines the two pieces of first interaction data as eighth interaction data, determines the adjustment amplitude corresponding to the two pieces of eighth interaction data, and sends a first update message to a second terminal, such that the second terminal updates the weight of the eighth interaction data based on the first update message, and then updates the first matching degree corresponding to the eighth interaction data. Therefore, the first matching degree is adjusted to select the interaction data to be played so that the two pieces of eighth interaction data belonging to the dancing type can be presented, and the two pieces of eighth interaction data belonging to the dancing type show the effect of a competition between them, thereby improving the play effect.

For another example, the server detects that any two pieces of first interaction data in the virtual space are both of a singing type and songs sung by anchors in the two pieces of first interaction data are the same, determines the two pieces of first interaction data as the eighth interaction data, determines the adjustment amplitude corresponding to any of the two pieces of eighth interaction data, and sends the first update message to the second terminal, such that the second terminal updates the weight of the eighth interaction data based on the first update message, and then updates the first matching degree corresponding to the eighth interaction data. Therefore, the first matching degree is adjusted to select the interaction data to be played, and the two pieces of eighth interaction data belonging to the singing type can be presented. Because the songs sung by the anchors in the two pieces of first interaction data are the same, an effect that the two anchors chorus is presented, thereby improving the play effect.

Step 604 is similar to a process of receiving, by the second terminal, the update message sent by the server to adjust interaction data to be played. Details are not described herein again.

In some embodiments, after step 604, the data play method further includes: in response to changes of the data type of any piece of the eighth interaction data, the server sends a cancel message to a plurality of second terminals accessing the virtual space, wherein the cancel message carries a first user account corresponding to the eighth interaction data; and the second terminal receives the cancel message sent by the server, searches for an adjustment amplitude stored corresponding to the first user account based on the first user account carried in the cancel message, restores the weight of the eighth interaction data based on the adjustment amplitude, and updates the first matching degree corresponding to the eighth interaction data based on the second matching degree between the first user account and the second user account as well as the restored weight of the eighth interaction data.

Since the weight of the eighth interaction data was adjusted before the second terminal based on the first update message sent by the server and the adjustment amplitude, the second terminal restores the weight of the eighth interaction data based on the adjustment amplitude after receiving the cancel message sent by the server to ensure that the weight of the restored eighth interaction data is the same as the weight before the adjustment. For example, in a case that the adjustment amplitude is an increase amplitude, the second terminal increases the weight of the eighth interaction data by the increase amplitude after receiving the first update message, and decreases the weight of the eighth interaction data by the increase amplitude after receiving the cancel message.

The server detects that a data type of any eighth interaction data changes, which means that data types of two pieces of eighth interaction data are different from each other. In this case, the two pieces of eighth interaction data do not have similarity any more, and a play effect cannot be improved any more. Therefore, to guarantee the weight of the eighth interaction data and accuracy of the corresponding matching degree, the cancel message is sent to the plurality of second terminals, such that the second terminal restores the weight of interaction data corresponding to the first user account carried in the cancel message, thus realizing weight restoration of the interaction data and guaranteeing accuracy the weight and the corresponding first matching degree of the interaction data. In this process, the adjustment amplitude is determined only when data types are the same. The adjustment amplitude is used as a temporary weight to adjust the weight of eighth interaction data and the corresponding first matching degree, so as to realize a competition effect between two pieces of eighth interaction data, and improve the effect. In addition, when the data type of any of the two pieces of eighth interaction data changes, an adjusted temporary weight is canceled, such that the weight of the eighth interaction data and the corresponding first matching degree are restored. This guarantees accuracy of the weight of the interaction data and the corresponding first matching degree.

In some embodiments, after step 604, the data play method further includes: in response to changes of the data type of any piece of the eighth interaction data, the server sends the cancel message to the plurality of second terminals accessing the virtual space, wherein the cancel message carries the first user account corresponding to the eighth interaction data and the adjustment amplitude; and the second terminal receives the cancel message sent by the server, restores the weight of the eighth interaction data based on the adjustment amplitude carried in the cancel message and updates the first matching degree corresponding to the eighth interaction data based on the second matching degree between the first user account and the second user account as well as the restored weight of the eighth interaction data.

In some embodiments, the data play method further includes steps 605 to 608.

In step 605, the server acquires the number of comments in the virtual space within a current time segment.

In this embodiment of the present disclosure, in a process of accessing the virtual space by a plurality of second terminals, the second terminal can send a comment to the server and the server issues the received comment in the virtual space to achieve interaction between the second user account and the first user account in the virtual space.

The current time segment is any time segment before a current time point. For example, a duration of the current time segment is 60 seconds, 90 seconds, or the like. When receiving a comment issued in the virtual space, the server can determine the number of comments issued within the current time segment based on time when the comment is issued.

In step 606, the server determines a second increase amplitude for a weight of ninth interaction data based on a data type to which each piece of first interaction data belongs within the current time segment and the number of comments.

The ninth interaction data is first interaction data that belongs to a target data type within the current time segment. The target data type is used to indicate that corresponding first interaction data includes a certain behavior that the anchor is carrying out, for example, the target data type is the singing data type, a dancing data type, a speaking data type, etc.

The ninth interaction data belonging to the target data type within the current time segment may be the interaction data that the second user account likes. Subsequently, a weight of the ninth interaction data needs to be increased. In addition, the number of comments within the current time segment can reflect how much the third user account accessing the virtual space likes the ninth interaction data. Therefore, a second increase amplitude for the weight of ninth interaction data is determined based on a data type to which at least one of pieces of first interaction data belongs within the current time segment and the number of comments, thereby facilitating subsequent adjustment for weight of the ninth interaction data.

In some embodiments, the step 606 includes: determining a fourth number, rounding a ratio between the number of comments and the fourth number to acquire a sixth value, and determining a product of a unit increase amplitude and the sixth value as the second increase amplitude.

An increase amplitude of the weight of the ninth interaction data is determined based on the number of comments and the number of pieces of ninth interaction data, such that each comment can impact the weight of only one piece of ninth interaction data. This ensures accuracy of a determined second increase amplitude.

For example, if the number of pieces of ninth interaction data belonging to the target data type within the current time segment is 5, and the number of comments is 11, an acquired sixth value is 2, a unit increase amplitude is 1, and an acquired second increase amplitude is 2.

In some embodiments, a process of determining a data type of first interaction data includes: identifying contents of each piece of first interaction data within the current time segment, and determining a data type to which each piece of first interaction data belongs within the current time segment. The data type to which each piece of first interaction data belongs indicates a data type to which corresponding contents included in the first interaction data belongs.

In step 607, the server sends a second update message to each of the plurality of second terminals, wherein the second update message carries the first user account corresponding to the ninth interaction data and the second increase amplitude.

In step 608, each second terminal increases the weight of the ninth interaction data based on the second increase amplitude carried in the second update message, adjusts a first matching degree corresponding to the ninth interaction data based on a matching degree between the first user account corresponding to the ninth interaction data and the second user account logged on to the second terminal as well as an adjusted weight of the ninth interaction data, and simultaneously plays at least two pieces of second interaction data on a playing interface based on an adjusted first matching degree, such that manners of playing the second interaction data having different first matching degrees are different.

The number of comments in a current period of time in the virtual space can reflect a liking level of ninth interaction data belonging to the target data type in the current period of time. A weight of the ninth interaction data belonging to the target data type in the current period of time is increased based on the number of comments in the current period of time. Then, the first matching degree corresponding to the ninth interaction data is adjusted to ensure that played interaction data meets the second user account's likes when the interaction data is subsequently played based on the adjusted first matching degree.

Step 608 is similar to a process of receiving, by the second terminal, an update message sent by a server to adjust interaction data to be played. Details are not described herein again.

The data play method according to this embodiment of the present disclosure provides a multi-person joint interaction. In the case of multi-person joint interaction, an adjustment amplitude of a weight of any first interaction data is determined based on ranking information of a plurality of pieces of first interaction data issued in a same virtual space by a plurality of first user accounts, such that a terminal subsequently adjusts the weight of the first interaction data based on the adjustment amplitude, to guarantee the effect of subsequently playing the interaction data by the terminal.

Moreover, in the case of multi-person joint live streaming, an adjustment amplitude corresponding to any of two pieces of eighth interaction data belonging to the same data type is determined based on the data type to which first interaction data issued in the same virtual space by a plurality of first user accounts belongs, such that the second terminal subsequently adjusts the weight of the eighth interaction data based on the adjustment amplitude to reduce a difference between weights of the two pieces of eighth interaction data, and further reduce a difference between first matching degrees corresponding to the two pieces of eighth interaction data. Subsequently, when interaction data is played based on first matching degrees of a plurality of pieces of first interaction data, an effect of subsequently playing a plurality of pieces of eighth interaction data belonging to the same data type is achieved, which presents an effect of interaction data confrontation, and improves the play effect. Interaction data having different matching degrees is played in different manners based on first matching degrees corresponding to the plurality of pieces of first interaction data, such that interaction data that is being played matches a second user account, thereby highlighting the interaction data that matches the like of the second user account, realizing personalized play and improving the play effect.

Figure 7:
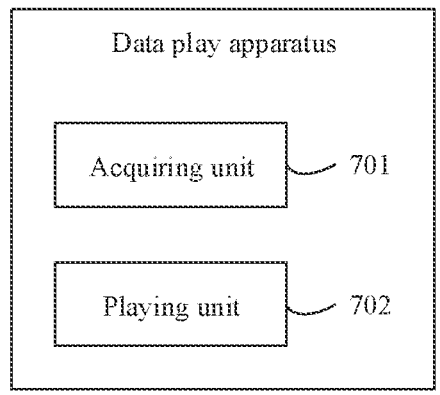
FIG. 7 is a block diagram of a data play apparatus according to an embodiment of the present disclosure.

FIG. 7 shows a data play apparatus according to an embodiment. Referring to FIG. 7, the data play apparatus includes:

an acquiring unit 701, configured to: in response to an access operation on a virtual space, acquire a plurality of pieces of first interaction data issued in the virtual space by a plurality of first user accounts and first matching degree corresponding to each piece of the first interaction data, wherein the first matching degree is used to indicate a matching degree between a first user account corresponding to the first interaction data and a second user account logged onto the terminal, and/or interaction on the first interaction data performed by a third user account accessing the virtual space; and a playing unit 702 configured to simultaneously play at least two pieces of second interaction data among the plurality of pieces of first interaction data on a playing interface of the virtual space based on the first matching degrees corresponding to the plurality of pieces of first interaction data, such that manners of playing of the second interaction data having different first matching degrees are different.

Figure 8:
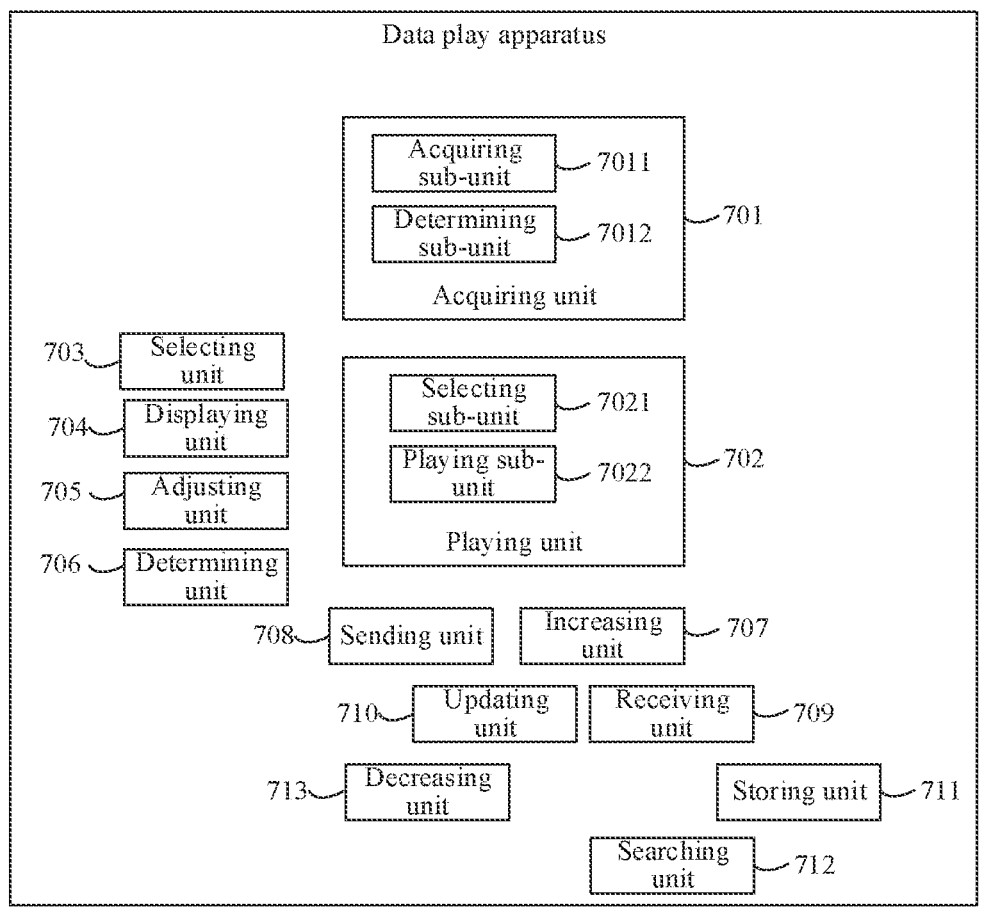
FIG. 8 is a block diagram of another data play apparatus according to an embodiment of the present disclosure.

In some embodiments, referring to FIG. 8, the playing unit 702 includes:

a selecting sub-unit 7021 configured to select at least two pieces of second interaction data having a larger first matching degree from the plurality of pieces of first interaction data based on the first matching degrees; and a playing sub-unit 7022 configured to simultaneously play the at least two pieces of second interaction data on the playing interface of the virtual space.

In some embodiments, the selecting sub-unit 7021 is configured to: determine an average value of the first matching degrees corresponding to the plurality of pieces of first interaction data; and select at least two pieces of second interaction data having the larger first matching degree from the plurality of pieces of first interaction data based on the average value of the first matching degrees corresponding to the plurality of pieces of first interaction data, where a first matching degree of each of the at least two pieces of the second interaction data is larger than the average value.

In some embodiments, referring to FIG. 8, the data play apparatus further includes:

a selecting unit 703, configured to: when positions of the at least two pieces of second interaction data in a queue change, select at least two pieces of third interaction data having a larger first matching degree from the plurality of pieces of first interaction data based on the first matching degrees, wherein in the queue, the plurality of pieces of first interaction data are ranked in an ascending or descending order based on corresponding first matching degrees; and the playing unit 702 is further configured to simultaneously play the at least two pieces of third interaction data on the playing interface.

In some embodiments, referring to FIG. 8, the data play apparatus further includes:

a displaying unit 704 configured to display one or more fourth user accounts corresponding to fourth interaction data on the playing interface, wherein the fourth interaction data is interaction data included in the plurality of pieces of first interaction data but is different from the second interaction data, and the fourth user account is a user account issuing the fourth interaction data; and the playing unit 702 is further configured to play the fourth interaction data on the playing interface in response to a trigger operation on any fourth user account.

In some embodiments, the playing unit 702 is further configured to display a pop-up window on the playing interface, and play the fourth interaction data in the pop-up window in response to the trigger operation on the fourth user account.

In some embodiments, the playing unit 702 is further configured to cancel playing of the fourth interaction data after a playing duration of the fourth interaction data reaches a first duration.

In some embodiments, the playing interface includes at least two playing regions of different sizes; and the playing unit 702 is further configured to play the at least two pieces of first interaction data in the at least two playing regions respectively based on the first matching degrees corresponding to the plurality of pieces of first interaction data, such that second interaction data played in a playing region of a larger size corresponds to a larger first matching degree.

In some embodiments, referring to FIG. 8, the data play apparatus further includes:

a displaying unit 704 configured to display one or more fourth user accounts corresponding to fourth interaction data in the account displaying region, wherein the fourth interaction data is interaction data included in the plurality of pieces of first interaction data but different from the second interaction data, and the fourth user account is a user account issuing the fourth interaction data; and the playing unit 702 is further configured to play the fourth interaction data on the playing interface in response to a trigger operation on any fourth user account.

In some embodiments, the playing unit 702 is further configured to: in response to detection of a confirmation operation on the fourth interaction data during a process of playing the fourth interaction data, replace the second interaction data played in a playing region with the smallest size with the fourth interaction data; or in response to a playing duration of the fourth interaction data reaching a target duration, replace the second interaction data played in the playing region with the smallest size with the fourth interaction data.

In some embodiments, the playing interface further includes an account displaying region whose size is smaller than a size of each playing region; and referring to FIG. 8, the data play apparatus further includes:

a displaying unit 704 configured to display one or more fourth user accounts corresponding to fourth interaction data in the account displaying region, wherein the fourth interaction data is interaction data included in the plurality of pieces of first interaction data but different from the second interaction data, and the fourth user account is a user account issuing the fourth interaction data; and the playing unit 702 is further configured to: in response to a drag operation on any fourth user account and releasing the drag operation in any of the playing regions, replace the second interaction data played in the playing region with the fourth interaction data corresponding to the fourth user account.

In some embodiments, the displaying unit 704 is configured to display a user account corresponding to the replaced second interaction data in the account displaying region.

In some embodiments, referring to FIG. 8, the acquiring unit 701 includes:

an acquiring sub-unit 7011 configured to acquire second matching degrees between the plurality of first user accounts and the second user account; and a determining sub-unit 7012 configured to determine the first matching degree corresponding to each piece of the first interaction data based on second matching degrees.

In some embodiments, the acquiring sub-unit 7011 is configured to: acquire a type tag corresponding to each of the first user accounts and a type tag corresponding to the second user account; determine the first number corresponding to each of the first user accounts, wherein the first number is used to indicate the number of type tags that correspond to the first user account and are the same as the type tags corresponding to the second user account; and determine the second matching degree between each of the first user accounts and the second user account based on the first number corresponding to the first user account.

In some embodiments, the acquiring sub-unit 7011 is configured to: for any first user account, determine a ratio of the first number corresponding to the first user account to a second number as the second matching degree between the first user account and the second user account, wherein the second number is the number of type tags corresponding to the second user account.

In some embodiments, the access operation is triggered based on a virtual space entry corresponding to a target user account; the target user account is any of the plurality of first user accounts; and the determining sub-unit 7012 is configured to: acquire a weight of each piece of the first interaction data; adjust a weight of target interaction data based on a relationship between the target user account and the second user account, wherein the target interaction data corresponds to the target user account; and determine the first matching degree corresponding to each piece of first interaction data based on the second matching degree between each of the first user accounts and the second user account, an adjusted weight of the target interaction data and a weight of fifth interaction data, wherein the fifth interaction data is interaction data included in the plurality of pieces of first interaction data but different from the target interaction data.

In some embodiments, the determining sub-unit 7012 is configured to: determine a sum value of the adjusted weight of the target interaction data and the weight of the fifth interaction data; determine a first ratio of the adjusted weight of the target interaction data to the sum value and a second ratio of the weight of the fifth interaction data to the sum value; determine a product of a second matching degree corresponding to the target user account and the first ratio as a first matching degree corresponding to the target interaction data; and determine a product of a second matching degree corresponding to the fifth interaction data and the second ratio as a first matching degree corresponding to the fifth interaction data, wherein the second matching degree corresponding to the fifth interaction data is a matching degree between a first user account corresponding to the fifth interaction data and the second user account.

In some embodiments, the determining sub-unit 7012 is configured to: determine a third increase amplitude of the target interaction data based on whether the target user account is a user account that the second user account follows; and increase the weight of the target interaction data based on the third increase amplitude.

In some embodiments, the determining sub-unit 7012 is configured to perform any one of the followings:

when the target user account is not the user account that the second user account follows, and the virtual space entry is a virtual space entry searched based on the target user account, determine a first value as the third increase amplitude of the target interaction data; and when the target user account is not the user account that the second user account follows, and the virtual space entry is a virtual space entry that corresponds to the target user account in a user account screened based on a screening condition, determine a second value as the third increase amplitude of the target interaction data, wherein the screening condition is used to screen the user account; and the first value is larger than the second value.

In some embodiments, referring to FIG. 8, the data play method further includes:

an adjusting unit 705 configured to adjust the second matching degrees between the plurality of first user accounts and the second user account in response to an interaction operation on any second interaction data that is being played; and a determining unit 706 configured to re-determine first matching degree corresponding to each piece of first interaction data based on an adjusted second matching degree between each of the first user accounts and the second user account.

In some embodiments, the adjusting unit 705 is configured to: determine a fourth increase amplitude of a second matching degree corresponding to the second interaction data based on the number of the interaction operation on the second interaction data, wherein the second matching degree corresponding to the second interaction data is a matching degree between a first user account corresponding to the second interaction data and the second user account; determine a ratio of the fourth increase amplitude to a third number as a decrease amplitude, wherein the third number is the number of pieces of interaction data that are different from the target interaction data among the plurality of pieces of first interaction data; increase the second matching degree corresponding to the second interaction data based on the fourth increase amplitude; and decrease a second matching degree corresponding to eleventh interaction data based on the decrease amplitude, wherein the eleventh interaction data is interaction data different from the second interaction data among the plurality of pieces of first interaction data, and the second matching degree corresponding to the eleventh interaction data is a matching degree between a first user account corresponding to the eleventh interaction data and the second user account.

In some embodiments, referring to FIG. 8, the data play method further includes:

an increasing unit 707 configured to increase the first matching degree corresponding to the second interaction data in response to an interaction operation on any second interaction data.

In some embodiments, the increasing unit 707 is configured to perform at least one of the followings:

increase the first matching degree corresponding to the second interaction data by a third value in response to a like giving operation on the second interaction data; and in response to a resource transferring operation on the first user account corresponding to the second interaction data, determine a product of the number of resources corresponding to the resource transferring operation and a fourth value as a fifth value, and increase the first matching degree corresponding to the second interaction data by the fifth value.

In some embodiments, referring to FIG. 8, the data play method further includes:

a sending unit 708 configured to send an update message to a server, wherein the update message carries the first user account corresponding to the second interaction data and a fifth increase amplitude of the first matching degree corresponding to the second interaction data, the server is configured to forward the update message to another terminal to which a fourth user account logs on, such as the another terminal increases the first matching degree corresponding to the second interaction data by the fifth increase amplitude based on the update message, wherein the fourth user account is a user account that is of the fourth user account accessing the virtual space and different from the second user account.

In some embodiments, referring to FIG. 8, the data play method further includes:

a receiving unit 709 configured to receive an update message sent by a server, wherein the update message carries any first user account and a target value; and an increasing unit 707 configured to increase a first matching degree corresponding to sixth interaction data by the target value based on the update message, wherein the sixth interaction data corresponds to the first user account carried in the update message.

In some embodiments, the update message further carries a play time point; the play time point indicates a time point at which the first matching degree corresponding to the sixth interaction data is increased; and the increasing unit 707 is configured to increase the first matching degree corresponding to the sixth interaction data by the target value in response to the sixth interaction data reaching the play time point, based on the update message.

In some embodiments, the first matching degree corresponding to the first interaction data is acquired based on a second user account corresponding to the first user account and the weight of the first interaction data; the second matching degree corresponding to the first user account is a matching degree between the first user account and the second user account; and referring to FIG. 8, the data play method further includes:

a receiving unit 709 configured to receive an update message sent by a server, wherein the update message carries any first user account and a first increase amplitude;

an increasing unit 707 configured to increase a weight of seventh interaction data by the first increase amplitude, wherein the seventh interaction data corresponds to the first user account; and an updating unit 710 configured to update the first matching degree corresponding to the seventh interaction data based on the second matching degree corresponding to the first user account and an increased weight of the seventh interaction data.

In some embodiments, the first increase amplitude is acquired by the server based on the weight of the seventh interaction data and a weight of twelfth interaction data; the twelfth interaction data is interaction data whose data type is the same as that of the seventh interaction data; and referring to FIG. 8, the data play method further includes:

a storing unit 711 used to correspondingly store the first user account and the first increase amplitude that are carried in the update message;

the receiving unit 709 is further configured to receive a cancel message sent by the server, wherein cancel message carries first user account; and a searching unit 712 configured to search for the first increase amplitude stored corresponding to any first user account based on the first user account carried in the cancel message; and a decreasing unit 713 configured to decrease the weight of the seventh interaction data by the first increase amplitude;

the updating unit 710 is further configured to update the first matching degree corresponding to the seventh interaction data based on the second matching degree corresponding to the first user account and a decreased weight of the seventh interaction data.

In some embodiments, the first increase amplitude is acquired by the server based on the weight of the seventh interaction data and a weight of twelfth interaction data; the twelfth interaction data is interaction data whose data type is the same as that of the seventh interaction data; and referring to FIG. 8, the data play method further includes:

the receiving unit 709 is further configured to receive a cancel message sent by the server, wherein the cancel message carries the first user account and the first increase amplitude; and a decreasing unit 713 configured to decrease the weight of the seventh interaction data by the first increase amplitude based on the cancel message; and the updating unit 710 is further configured to update the first matching degree corresponding to the seventh interaction data based on the second matching degree corresponding to the first user account and a decreased weight of the seventh interaction data.

Figure 9:
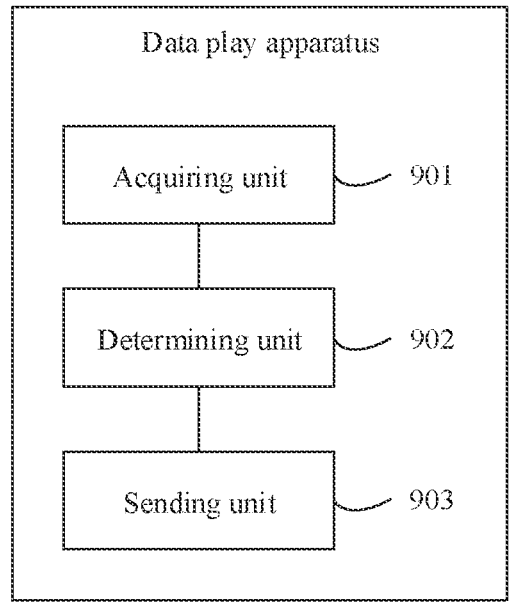
FIG. 9 is a block diagram of still another data play apparatus according to an embodiment of the present disclosure.

FIG. 9 shows a data play apparatus according to an embodiment. Referring to FIG. 9, the data play method includes:

an acquiring unit 901 configured to acquire a plurality of pieces of first interaction data issued in a virtual space by a plurality of first user accounts and a weight of each piece of the first interaction data;

a determining unit 902 configured to determine an adjustment amplitude corresponding to eighth interaction data based on ranking information of the plurality of pieces of first interaction data, wherein the adjustment amplitude is used to adjust a weight of the eighth interaction data; the ranking information indicates that the plurality of pieces of first interaction data are ranked in an ascending or descending order based on weights; and the eighth interaction data is any piece of first interaction data; and a sending unit 903 configured to send a first update message to a plurality of terminals accessing the virtual space, wherein the first update message carries a first user account corresponding to the eighth interaction data and the adjustment amplitude.

In some embodiments, the determining unit 902 is configured to: in a case that positions of the two pieces of eighth interaction data in a queue are not adjacent to each other, determine an adjustment amplitude corresponding to either of the two pieces of eighth interaction data based on a difference between weights of the two pieces of eighth interaction data, wherein the two pieces of eighth interaction data are any two pieces of first interaction data whose data types are the same.

In some embodiments, the acquiring unit 901 is further configured to acquire the number of comments in the virtual space within a current time segment;

the determining unit 902 is further configured to determine a second increase amplitude for a weight of ninth interaction data based on a data type to which each piece of the first interaction data belongs within the current time segment and the number of comments, wherein the ninth interaction data is first interaction data that belongs to a target data type within the current time segment; and the sending unit 903 is configured to send a second update message to the plurality of terminals, wherein the second update message carries a first user account corresponding to the ninth interaction data and the second increase amplitude.

In some embodiments, the determining unit 902 is configured to: determine a fourth number, wherein the fourth number is the number of pieces of the ninth interaction data; round a ratio between the number of comments and the fourth number to acquire a sixth value; and determine a product of a unit increase amplitude and the sixth value as the second increase amplitude.

Figure 10:
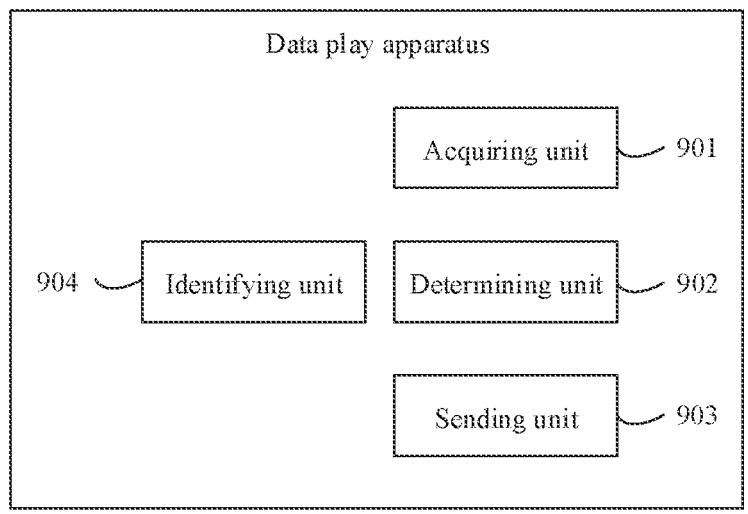
FIG. 10 is a block diagram of yet another data play apparatus according to an embodiment of the present disclosure.

In some embodiments, referring to FIG. 10, the data play method further includes:

an identifying unit 904 configured to identify contents of each piece of the first interaction data, and determine a data type to which each piece of the first interaction data belongs, wherein the data type to which the first interaction data belongs indicates a data type to which contents included in the first interaction data belongs.

In some embodiments, the acquiring unit 901 is configured to acquire an initial weight of each piece of the first interaction data; and update the initial weights of the plurality of pieces of first interaction data based on a third update message sent by the plurality of terminals.

In some embodiments, the acquiring unit 901 is configured to receive the third update message sent by any of the terminals, wherein the third update message carries any first user account and a sixth increase amplitude; and increase an initial weight of first interaction data corresponding to the first user account by the sixth increase amplitude based on the third update message.

Figure 11:
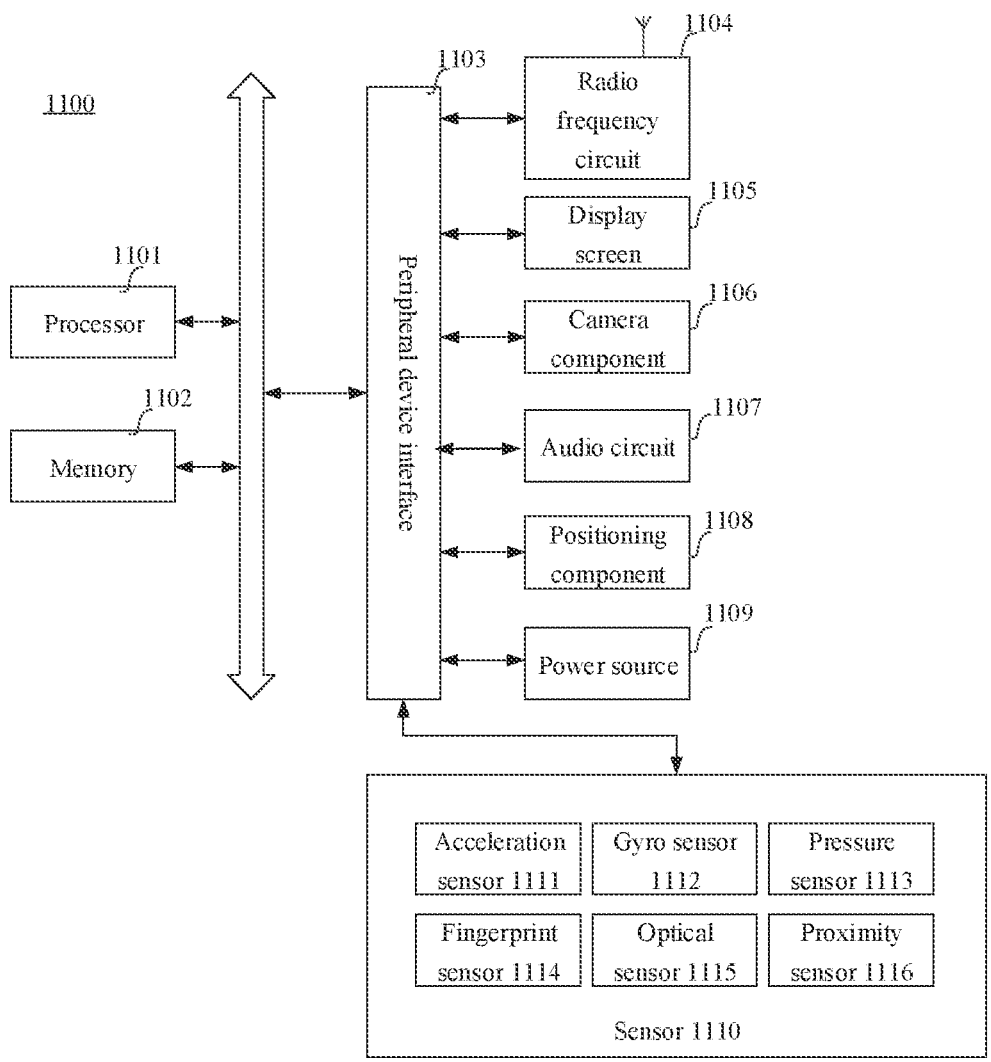
FIG. 11 is a block diagram of a terminal according to an embodiment of the present disclosure.

FIG. 11 is a block diagram of a terminal 1100 according to an embodiment of the present disclosure. The terminal 1100 may be a portable mobile terminal, such as a smart mobile phone, a tablet computer, a Moving Picture Experts Group Audio Layer III (MP3) player, a Moving Picture Experts Group Audio Layer IV (MP4) player, and a laptop or desk computer. The terminal 1100 may also be called user equipment (UE), a portable terminal, a laptop terminal, a desk terminal, etc.

Usually, the terminal 1100 includes a processor 1101 and a memory 1102.

The processor 1101 may include one or more processing cores, such as a 4-core processor and an 8-core processor. The processor 1101 may be formed by at least one hardware of a digital signal processing (DSP), a field-programmable gate array (FPGA), and a programmable logic array (PLA). The processor 1101 may also include a main processor and a coprocessor. The main processor is a processor for processing the data in an awake state, and is also called a central processing unit (CPU). The coprocessor is a low-power-consumption processor for processing the data in a standby state. In some embodiments, the processor 1101 may be integrated with a graphics processing unit (GPU), which is configured to render and draw the contents that needs to be displayed by a display screen. In some embodiments, the processor 1101 may also include an artificial intelligence (AI) processor used to process computational operations related to machine learning.

The memory 1102 may include one or more computer-readable storage mediums, which can be non-transitory. The memory 1102 may also include a high-speed random-access memory, as well as a non-volatile memory, such as one or more disk storage devices and flash storage devices. In some embodiments, the non-transitory computer-readable storage medium in the memory 1102 is configured to store at least one program code. The at least one program code is configured to be executed by the processor 1101 of the terminal to implement the data play method according to the embodiments of the present disclosure.

In some embodiments, the terminal 1100 also optionally includes a peripheral device interface 1103 and at least one peripheral device. The processor 1101, the memory 1102, and the peripheral device interface 1103 may be connected by a bus or a signal line. Each peripheral device may be connected to the peripheral device interface 1103 by a bus, a signal line or a circuit board. Specifically, the peripheral device includes at least one of a radio frequency circuit 1104, a touch display screen 1105, a camera component 1106, an audio circuit 1107, a positioning component 1108 and a power source 1109.

The peripheral device interface 1103 may be configured to connect at least one peripheral device associated with an input/output (I/O) to the processor 1101 and the memory 1102. In some embodiments, the processor 1101, the memory 1102 and the peripheral device interface 1103 are integrated on the same chip or circuit board. In some other embodiments, any one or two of the processor 1101, the memory 1102 and the peripheral device interface 1103 may be implemented on a separate chip or circuit board, which is not limited in the present embodiment.

The radio frequency circuit 1104 is configured to receive and transmit a radio frequency (RF) signal, which is also referred to as an electromagnetic signal. The radio frequency circuit 1104 communicates with a communication network and other communication devices via the electromagnetic signal. The radio frequency circuit 1104 converts the electrical signal into the electromagnetic signal for transmission, or converts the received electromagnetic signal into the electrical signal. Optionally, the radio frequency circuit 1104 includes an antenna system, an RF transceiver, one or more amplifiers, a tuner, an oscillator, a digital signal processor, a codec chipset, a subscriber identity module card, and the like. The radio frequency circuit 1104 can communicate with other terminals via at least one wireless communication protocol. The wireless communication protocol includes, but not limited to, the World Wide Web, a metropolitan area network, an intranet, various generations of mobile communication networks (2G, 3G, 4G, and 5G), a wireless local area network, and/or a wireless fidelity (WiFi) network. In some embodiments, the RF circuit 1104 may also include near field communication (NFC) related circuits, which is not limited in the present disclosure.

The display screen 1105 is configured to display a user interface (UI). The UI may include graphics, text, icons, videos, and any combination thereof. When the display screen 1105 is a touch display screen, the display screen 1105 also has the capacity to acquire touch signals on or over the surface of the display screen 1105. The touch signal may be input into the processor 1101 as a control signal for processing. At this time, the display screen 1105 may also be configured to provide virtual buttons and/or virtual keyboards, which are also referred to as soft buttons and/or soft keyboards. In some embodiments, one display screen 1105 may be disposed on the front panel of the terminal 1100. In some other embodiments, at least two display screens 1105 may be disposed respectively on different surfaces of the terminal 1100 or in a folded design. In further embodiments, the display screen 1105 may be a flexible display screen disposed on the curved or folded surface of the terminal 1100. Even the display screen 1105 may have an irregular shape other than a rectangle; that is, the display screen 1105 may be an irregular-shaped screen. The display screen 1105 may be an organic light-emitting diode (OLED) display screen.

The camera component 1106 is configured to capture images or videos. Optionally, the camera component 1106 includes a front camera and a rear camera. Usually, the front camera is placed on the front panel of the terminal, and the rear camera is placed on the back of the terminal. In some embodiments, at least two rear cameras are disposed, and are at least one of a main camera, a depth-of-field camera, a wide-angle camera, and a telephoto camera respectively, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 1106 may also include a flashlight. The flashlight may be a mono-color temperature flashlight or a two-color temperature flashlight. The two-color temperature flash is a combination of a warm flashlight and a cold flashlight and can be used for light compensation at different color temperatures.

The audio circuit 1107 may include a microphone and a speaker. The microphone is configured to collect sound waves of users and environments, and convert the sound waves into electrical signals which are input into the processor 1101 for processing, or input into the RF circuit 1104 for voice communication. For the purpose of stereo acquisition or noise reduction, there may be a plurality of microphones respectively disposed at different locations of the terminal 1100. The microphone may also be an array microphone or an omnidirectional acquisition microphone. The speaker is then configured to convert the electrical signals from the processor 1101 or the radio frequency circuit 1104 into the sound waves. The speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 1107 may also include a headphone jack.

The positioning component 1108 is configured to locate the current geographic location of the terminal 1100 to implement navigation or location-based service (LBS). The positioning component 1108 may be a positioning component based on the American global positioning system (GPS), the Chinese Beidou system, the Russian GRONASS system or the Galileo system of the European Union.

The power source 1109 is configured to power up various components in the terminal 1100. The power source 1109 may be alternating current, direct current, a disposable battery, or a rechargeable battery. When the power source 1109 includes the rechargeable battery, the rechargeable battery may a wired rechargeable battery or a wireless rechargeable battery. The wired rechargeable battery is a battery charged by a cable line, and wireless rechargeable battery is charged by a wireless coil. The rechargeable battery may also support the fast charging technology.

In some embodiments, the terminal 1100 also includes one or more sensors 1110. The one or more sensors 1110 include, but not limited to, an acceleration sensor 1111, a gyro sensor 1112, a pressure sensor 1113, a fingerprint sensor 1114, an optical sensor 1115 and a proximity sensor 1116.

The acceleration sensor 1111 may detect magnitudes of accelerations on three coordinate axes of a coordinate system established by the terminal 1100. For example, the acceleration sensor 1111 may be configured to detect components of a gravitational acceleration on the three coordinate axes. The processor 1101 may control the touch display screen 1105 to display a user interface in a landscape view or a portrait view according to a gravity acceleration signal collected by the acceleration sensor 1111. The acceleration sensor 1111 may also be configured to collect motion data of a game or a user.

The gyro sensor 1112 can detect a body direction and a rotation angle of the terminal 1100, and can cooperate with the acceleration sensor 1111 to collect a 3D motion of the user on the terminal 1100. Based on the data collected by the gyro sensor 1112, the processor 1101 can serve the following functions: motion sensing (such as changing the UI according to a user's tilt operation), image stabilization during shooting, game control and inertial navigation.

The pressure sensor 1113 may be disposed on a side frame of the terminal 1100 and/or a lower layer of the touch display screen 1105. When the pressure sensor 1113 is disposed on the side frame of the terminal 1100, a user's holding signal to the terminal 1100 can be detected. The processor 1101 can perform left-right hand recognition or quick operation according to the holding signal collected by the pressure sensor 1113. When the pressure sensor 1113 is disposed on the lower layer of the touch display screen 1105, the processor 1101 controls an operable control on the UI according to a user's pressure operation on the touch display screen 1105. The operable control includes at least one of a button control, a scroll bar control, an icon control and a menu control.

The fingerprint sensor 1114 is configured to collect a user's fingerprint. The processor 1101 identifies the user's identity based on the fingerprint collected by the fingerprint sensor 1114, or the fingerprint sensor 1114 identifies the user's identity based on the collected fingerprint. When the user's identity is identified as trusted, the processor 1101 authorizes the user to perform related sensitive operations, such as unlocking the screen, viewing encrypted information, downloading software, paying, and changing settings. The fingerprint sensor 1114 may be provided on the front, back, or side of the terminal 1100. When the terminal 1100 is provided with a physical button or a manufacturer's Logo, the fingerprint sensor 1114 may be integrated with the physical button or the manufacturer's Logo.

The optical sensor 1115 is configured to collect ambient light intensity. In one embodiment, the processor 1101 may control the display brightness of the touch display screen 1105 according to the ambient light intensity collected by the optical sensor 1115. Specifically, when the ambient light intensity is high, the display brightness of the touch display screen 1105 is increased; and when the ambient light intensity is low, the display brightness of the touch display screen 1105 is decreased. In another embodiment, the processor 1101 may also dynamically adjust shooting parameters of the camera component 1106 according to the ambient light intensity collected by the optical sensor 1115.

The proximity sensor 1116, also referred to as a distance sensor, is usually disposed on the front panel of the terminal 1100. The proximity sensor 1116 is configured to capture a distance between the user and a front surface of the terminal 1100. In one embodiment, when the proximity sensor 1116 detects that the distance between the user and the front surface of the terminal 1100 becomes gradually smaller, the processor 1101 controls the touch display screen 1105 to switch from a screen-on state to a screen-off state. When it is detected that the distance between the user and the front surface of the terminal 1100 gradually increases, the processor 1101 controls the touch display screen 1105 to switch from the screen-off state to the screen-on state.

It will be understood by those skilled in the art that the structure shown in FIG. 11 does not constitute a limitation to the terminal 1100, and may include more or less components than those illustrated, or combine some components or adopt different component arrangements.

In some embodiments, the terminal includes: one or more processors; and one or more volatile or non-volatile memories for storing instructions executable by the one or more processors, wherein the one or more processors is/are configured to execute the data play method.

Figure 12:
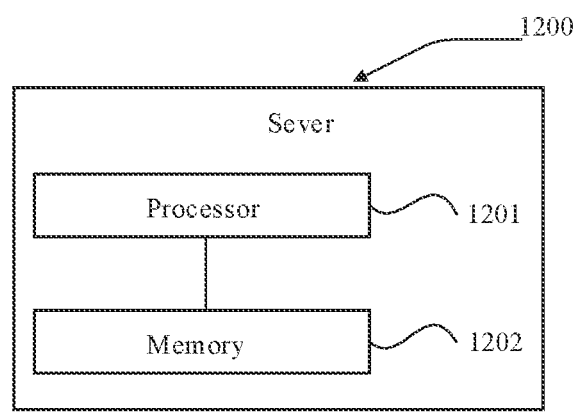
FIG. 12 is a block diagram of a server according to an embodiment of the present disclosure.

In some embodiments, the terminal is provided as a server. FIG. 12 is a schematic structural diagram of a server according to an embodiment of the present disclosure. Significant differences may be generated when the server 1200 has different configurations or performances. The server 1200 may include one or more processors (CPU) 1201 and one or more memories 1202 stored with at least one piece of program code. The at least one piece of program code, when loaded and executed by the one or more processors 1201, can realize the data play method according to the foregoing method embodiments. Of course, the server may further include components such as a wired or wireless network interface, a keyboard, and an input/output interface for input and output, and the server may further include other components for implementing device functions, which is not repeated here.

In some embodiments, the server includes: one or more processors; and one or more volatile or non-volatile memories for storing instructions executable by the one or more processors, wherein the one or more processors is/are configured to execute the data play method.

In an embodiment, there is also provided a non-temporary computer-readable storage medium. When program codes stored in the storage medium is executed by a processor of an electronic device, the electronic device is enabled to perform the steps of the above data play method. Optionally, the above storage medium may be a non-temporary computer-readable storage medium, such as a read-only memory (ROM), a random-access memory (RAM), a compact disc ROM (CD-ROM), a magnetic tape, a floppy disc, an optical data storage device or the like.

In some embodiments, when at least one piece of program code in the non-temporary computer-readable storage medium is executed by a processor of a server, the server is enabled to realize the above data play method. Or when the at least one piece of program code in the non-temporary computer-readable storage medium is executed by a processor of a terminal, the terminal is enabled to realize the above data play method.

In an embodiment, there is also provided a computer program product. When instructions in the computer program product are executed by a processor of a terminal or server, the terminal or server is enabled to realize the above data play method.

All the embodiments of the present disclosure can be executed independently or in combination with other embodiments, both of which should be deemed to fall within the protection scope of the present disclosure.

What is claimed is:

1. A data play method, which is executed by a terminal, the method comprising:

in response to an access operation on a virtual space, acquiring a plurality of pieces of first interaction data issued in the virtual space by a plurality of first user accounts and a first matching degree corresponding to each piece of the first interaction data, wherein the first matching degree is configured to represent a matching degree between a first user account corresponding to the first interaction data and a second user account logged onto the terminal and/or an interaction on the first interaction data performed by a third user account accessing the virtual space, wherein the first user account is an anchor's account, the second user account and the third user account are audience accounts; and simultaneously playing, on the terminal, at least two pieces of second interaction data among the plurality of pieces of first interaction data on a playing interface of the virtual space based on the first matching degrees corresponding to the plurality of pieces of first interaction data, wherein manners of playing the second interaction data having different first matching degrees are different.

2. The data play method according to claim 1, further comprising:

in a case that positions of the at least two pieces of second interaction data in a queue change, selecting at least two pieces of third interaction data having a larger first matching degree from the plurality of pieces of first interaction data based on the first matching degrees, wherein the plurality of pieces of first interaction data are ranked in an ascending or descending order in the queue based on corresponding first matching degrees; and simultaneously playing the at least two pieces of third interaction data on the playing interface.

3. The data play method according to claim 1, further comprising:

displaying one or more fourth user accounts corresponding to fourth interaction data on the playing interface, wherein the fourth interaction data is interaction data included in the plurality of pieces of first interaction data but different from the second interaction data, and the fourth user account is a user account issuing the fourth interaction data; and playing the fourth interaction data on the playing interface in response to a trigger operation on any fourth user account.

4. The data play method according to claim 3, wherein said playing the fourth interaction data on the playing interface in response to the trigger operation on any fourth user account comprises:

displaying a pop-up window on the playing interface and playing the fourth interaction data in the pop-up window in response to the trigger operation on the fourth user account.

5. The data play method according to claim 1, wherein the playing interface comprises at least two playing regions of different sizes, and said simultaneously playing the at least two pieces of second interaction data among the plurality of pieces of first interaction data on the playing interface of the virtual space based on the first matching degrees comprises:

playing the at least two pieces of second interaction data in the at least two playing regions based on the first matching degrees, wherein second interaction data played in a playing region of a larger size corresponds to a larger first matching degree.

6. The data play method according to claim 5, wherein the playing interface further comprises an account displaying region whose size is smaller than a size of each playing region, and the data play method further comprises:
  displaying one or more fourth user accounts corresponding to fourth interaction data in the account displaying region, wherein the fourth interaction data is interaction data included in the plurality of pieces of first interaction data but different from the second interaction data, and the fourth user account is a user account issuing the fourth interaction data; and
  playing the fourth interaction data on the playing interface in response to a trigger operation on any fourth user account.

7. The data play method according to claim 6, further comprising:
  in response to detection of a confirmation operation on the fourth interaction data during a process of playing the fourth interaction data, replacing second interaction data played in a playing region with the smallest size with the fourth interaction data; or
  in response to a playing duration of the fourth interaction data reaching a target duration, replacing the second interaction data played in a playing region with the smallest size with the fourth interaction data.

8. The data play method according to claim 5, wherein the playing interface further comprises an account displaying region whose size is smaller than a size of each playing region, and the data play method further comprises:
  displaying one or more fourth user accounts corresponding to fourth interaction data in the account displaying region, wherein the fourth interaction data is interaction data included in the plurality of pieces of first interaction data but different from the second interaction data, and the fourth user account is a user account issuing the fourth interaction data; and
  in response to a drag operation on any of the fourth user account and releasing the drag operation in any of the playing regions, replacing the second interaction data played in the playing region with the fourth interaction data.

9. The data play method according to claim 1, wherein said acquiring the first matching degree corresponding to each piece of the first interaction data comprises:
  acquiring second matching degrees between the plurality of first user accounts and the second user account; and
  determining the first matching degree corresponding to each piece of the first interaction data based on second matching degrees.

10. The data play method according to claim 9, wherein the access operation is triggered based on a virtual space entry corresponding to a target user account; the target user account is any of the plurality of first user accounts, and said determining the first matching degree corresponding to each piece of the first interaction data based on the second matching degrees comprises:
  acquiring a weight of each piece of the first interaction data;
  adjusting a weight of target interaction data based on a relationship between the target user account and the second user account, wherein the target interaction data corresponds to the target user account; and
  determining the first matching degree corresponding to each piece of first interaction data based on the second matching degrees, an adjusted weight of the target interaction data, and a weight of fifth interaction data, wherein the fifth interaction data is interaction data included in the plurality of pieces of first interaction data but different from the target interaction data.

11. The data play method according to claim 9, further comprising:
  adjusting the second matching degrees between the plurality of first user accounts and the second user account in response to an interaction operation on any second interaction data that is being played; and
  re-determining the first matching degree corresponding to each piece of first interaction data based on an adjusted second matching degree between each of the first user accounts and the second user account.

12. The data play method according to claim 1, further comprising:
  increasing the first matching degree corresponding to the second interaction data in response to an interaction operation on any second interaction data.

13. The data play method according to claim 1, further comprising:
  receiving an update message sent by a server, wherein the update message carries any first user account and a target value; and
  increasing a first matching degree corresponding to sixth interaction data by the target value based on the update message, wherein the sixth interaction data corresponds to the first user account carried in the update message.

14. The data play method according to claim 13, wherein the update message further carries a play time point, the play time point indicates a time point at which the first matching degree corresponding to the sixth interaction data is increased, and said increasing the first matching degree corresponding to the sixth interaction data by the target value based on the update message comprises:
  increasing the first matching degree corresponding to the sixth interaction data by the target value in response to reaching the play time point, based on the update message.

15. The data play method according to claim 1, wherein the first matching degree corresponding to the first interaction data is generated based on a second matching degree corresponding to the first user account and a weight of the first interaction data; the second matching degree corresponding to the first user account is a matching degree between the first user account and the second user account; and the data play method further includes:
  receiving an update message sent by a server, wherein the update message carries any first user account and a first increase amplitude;
  increasing a weight of seventh interaction data by the first increase amplitude, wherein the seventh interaction data corresponds to the first user account carried in the update message; and
  updating the first matching degree corresponding to the seventh interaction data based on the second matching degree corresponding to the first user account and an increased weight of the seventh interaction data.

16. The data play method according to claim 15, further comprising:
  correspondingly storing the first user account and the first increase amplitude that are carried in the update message; receiving a cancel message sent by the server, wherein the cancel message carries the first user account; searching for the first increase amplitude stored corresponding to the first user account based on the first user account carried in the cancel message;

decreasing the weight of the seventh interaction data by the first increase amplitude; and updating the first matching degree corresponding to the seventh interaction data based on the second matching degree corresponding to the first user account and a decreased weight of the seventh interaction data; or receiving a cancel message sent by the server, wherein the cancel message carries the first user account and the first increase amplitude; decreasing the weight of the seventh interaction data corresponding to the first user account by the first increase amplitude based on the cancel message; and updating the first matching degree corresponding to the seventh interaction data based on the second matching degree corresponding to the first user account and a decreased weight of the seventh interaction data.

17. A data play method, which is executed by a server and comprises:

acquiring a plurality of pieces of first interaction data issued in a virtual space by a plurality of first user accounts and a weight of each piece of the first interaction data;

determining an adjustment amplitude corresponding to first interaction data of a to be adjusted first user account based on ranking information of the plurality of pieces of first interaction data, wherein the adjustment amplitude is used to adjust a weight of the first interaction data of the to be adjusted first user account; the ranking information indicates a rank of the plurality of pieces of first interaction data in an ascending or a descending order based on weights; and sending a first update message to a plurality of terminals accessing the virtual space, wherein the first update message carries the to be adjusted first user account and the adjustment amplitude.

18. The data play method according to claim 17, wherein said determining the adjustment amplitude corresponding to the first interaction data of the to be adjusted first user account among the plurality of pieces of first interaction data based on the ranking information of the plurality of pieces of first interaction data includes:

in a case that positions of two pieces of first interaction data of the to be adjusted first user account in a queue are not adjacent to each other, determining an adjustment amplitude corresponding to either of the two pieces of first interaction data of the to be adjusted first user account based on a difference between weights of the two pieces of first interaction data of the to be adjusted first user account, wherein the two pieces of first interaction data of the to be adjusted first user account are any two pieces of first interaction data whose data types are the same.

19. The data play method according to claim 17, further comprising:

acquiring the number of comments in the virtual space within a current time segment;

determining an increase amplitude for a weight of first interaction data whose data type belongs to a target data type within the current time segment based on the number of the comments; and sending a second update message to the plurality of terminals, wherein the second update message carries the first user account whose data type belongs to the target data type within the current time segment and the second increase amplitude.

20. A terminal, comprising:

one or more processors; and a volatile or non-volatile memory for storing instructions executable by the one or more processors, wherein the one or more processors is/are configured to execute the following steps:

in response to an access operation on a virtual space, acquiring a plurality of pieces of first interaction data issued in the virtual space by a plurality of first user accounts and a first matching degree corresponding to each piece of the first interaction data, wherein the first matching degree is used to indicate a matching degree between a first user account corresponding to the first interaction data and a second user account logged onto the terminal, and/or an interaction on the first interaction data performed by a third user account accessing the virtual space, wherein the first user account is an anchor's account, the second user account and the third user account are audience' account; and simultaneously playing at least two pieces of second interaction data among the plurality of pieces of first interaction data on a playing interface of the virtual space based on the first matching degrees corresponding to the plurality of pieces of first interaction data, wherein manners of playing the second interaction data having different first matching degrees are different.

* * * * *